US012629942B2

(12) United States Patent
Kawamata et al.

(10) Patent No.: US 12,629,942 B2
(45) Date of Patent: May 19, 2026

(54) INK-JET RECORDING APPARATUS CAPABLE OF MOVING SUPPLY MEMBER FOR SUPPLYING CLEANING LIQUID TO BLADE UPSTREAM OR DOWNSTREAM IN FORWARD DIRECTION OF WIPING ACTION ACCORDING TO POSITION OF INK-JET HEAD

(71) Applicant: KYOCERA Document Solutions Inc., Osaka (JP)

(72) Inventors: Shuhei Kawamata, Osaka (JP); Yasutaka Inui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 142 days.

(21) Appl. No.: 18/893,111

(22) Filed: Sep. 23, 2024

(65) Prior Publication Data

US 2025/0100286 A1 Mar. 27, 2025

(30) Foreign Application Priority Data

Sep. 27, 2023 (JP) ................................ 2023-166379

(51) Int. Cl.
*B41J 2/165* (2006.01)

(52) U.S. Cl.
CPC .. *B41J 2/16552* (2013.01); *B41J 2002/16558* (2013.01); *B41J 2002/16576* (2013.01)

(58) Field of Classification Search
CPC .......... B41J 2/16552; B41J 2002/16558; B41J 2002/16576; B41J 2/16538; B41J 2/16541; B41J 2/16544; B41J 2/16585; B41J 2/16535
See application file for complete search history.

(56) References Cited

U.S. PATENT DOCUMENTS

| | | | | |
|---|---|---|---|---|
| 2018/0194141 | A1 | 7/2018 | Araki et al. | |
| 2019/0023017 | A1* | 1/2019 | Fujimori | B41J 2/16526 |
| 2022/0314623 | A1* | 10/2022 | Matsuyama | B41J 2/16552 |

FOREIGN PATENT DOCUMENTS

| | | | |
|---|---|---|---|
| JP | 2018108711 | A | 7/2018 |

* cited by examiner

*Primary Examiner* — Ricardo I Magallanes
*Assistant Examiner* — Tracey M Mcmillion
(74) *Attorney, Agent, or Firm* — IP Business Solutions, LLC.

(57) ABSTRACT

An ink-jet recording apparatus includes: an ink-jet head with a nozzle plate; a blade that wipes the nozzle plate; a supply member provided upstream of the nozzle plate in a direction of wiping and capable of supplying a cleaning liquid to the blade upon contact with the blade; a link member that supports the supply member and rocks about a shaft below the supply member; a biasing member that biases the link member upstream in the wiping direction; and a pressing portion provided in conjunction with the ink-jet head and facing the supply member. While the ink-jet head is moved up, the supply member is kept away from the nozzle plate upstream in the wiping direction. When the ink-jet head moves down, the pressing portion presses down the supply member against a biasing force of the biasing member and, thus, the supply member moves downstream in the wiping direction.

6 Claims, 30 Drawing Sheets

INK-JET RECORDING APPARATUS CAPABLE OF MOVING SUPPLY MEMBER FOR SUPPLYING CLEANING LIQUID TO BLADE UPSTREAM OR DOWNSTREAM IN FORWARD DIRECTION OF WIPING ACTION ACCORDING TO POSITION OF INK-JET HEAD

INCORPORATION BY REFERENCE

This application claims priority to Japanese Patent Application No. 2023-166379 filed on 27 Sep. 2023, the entire contents of which are incorporated by reference herein.

BACKGROUND

The present disclosure relates to ink-jet recording apparatuses.

In ink-jet recording apparatuses, while an image formation job is not executed, water evaporates from ink in the nozzles of the ink-jet head, which increases the viscosity of the ink and may result in clogging of the nozzles. For the purpose of preventing the clogging, purge processing of forcefully discharging the ink in the nozzles to caps is performed. However, if ink remaining on the nozzle surface of the ink-jet head is allowed to stand, there arise a problem of falling of the ink onto a sheet during execution of an image formation job and a problem of sticking of the ink to the nozzle surface. Therefore, techniques for removing ink remaining on a nozzle surface are being considered. For example, there is proposed a technique of removing ink from a nozzle surface by sliding a blade allowed to contact the nozzle surface.

SUMMARY

A technique improved over the aforementioned technique is proposed as one aspect of the present disclosure.

An ink-jet recording apparatus according to an aspect of the present disclosure includes an ink-jet head, a head lift, a blade, a supply member, a link member, a biasing member, and a pressing portion. The ink-jet head includes a nozzle plate. The head lift moves the ink-jet head up and down. The blade performs a wiping action along a nozzle surface of the nozzle plate. The supply member is provided upstream of the nozzle plate in a forward direction of the wiping action and supplies a cleaning liquid to the blade upon contact with a top edge of the blade. The link member supports the supply member and rocks about a shaft provided below the supply member. The biasing member biases the link member upstream in the forward direction. The pressing portion is provided in conjunction with the ink-jet head and faces a top surface of the supply member. While the ink-jet head is moved up, the supply member is kept away from the nozzle plate upstream in the forward direction. When the ink-jet head moves down, the pressing portion presses down the supply member against a biasing force of the biasing member and, thus, the supply member moves downstream in the forward direction.

DETAILED DESCRIPTION

Hereinafter, a description will be given of an ink-jet recording apparatus 1 according to an embodiment of the present disclosure with reference to the drawings.

Figure 1:
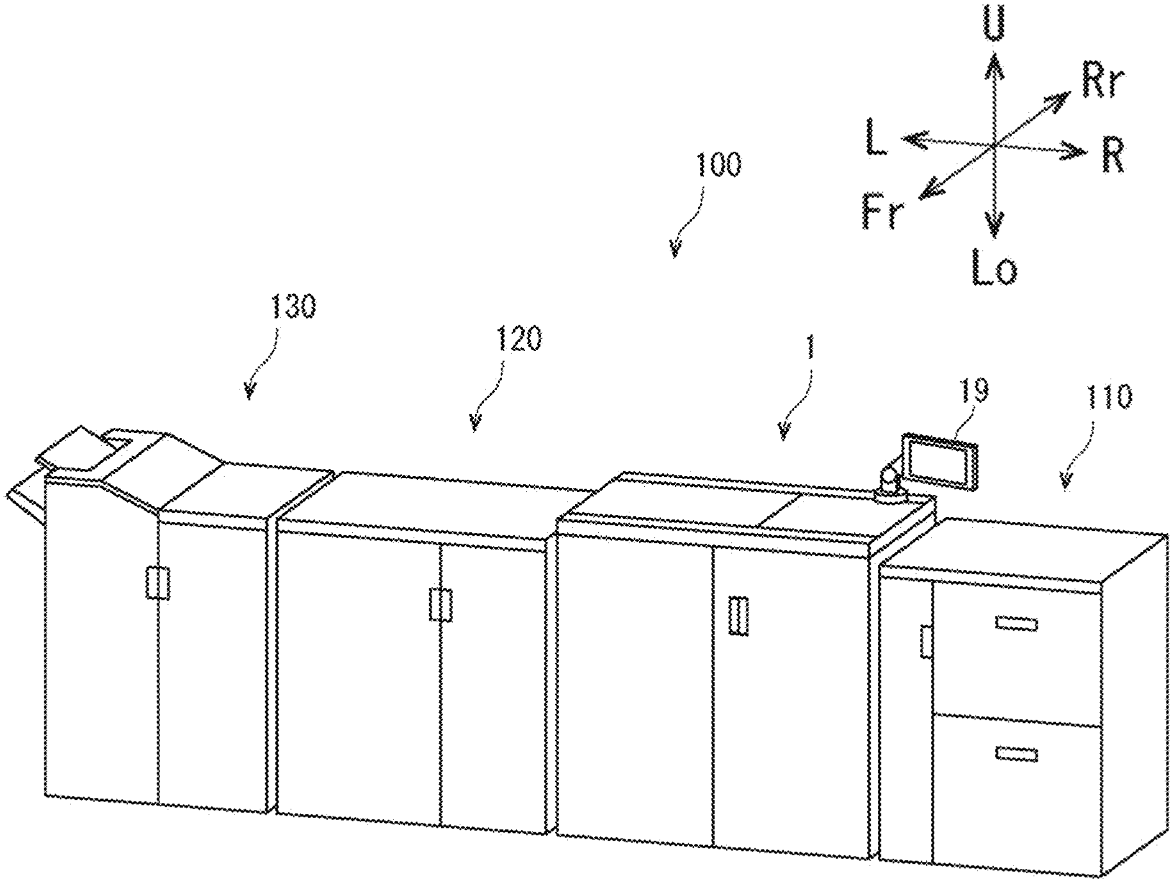
FIG. 1 is a perspective view showing an appearance of an image formation system.
Figure 2:
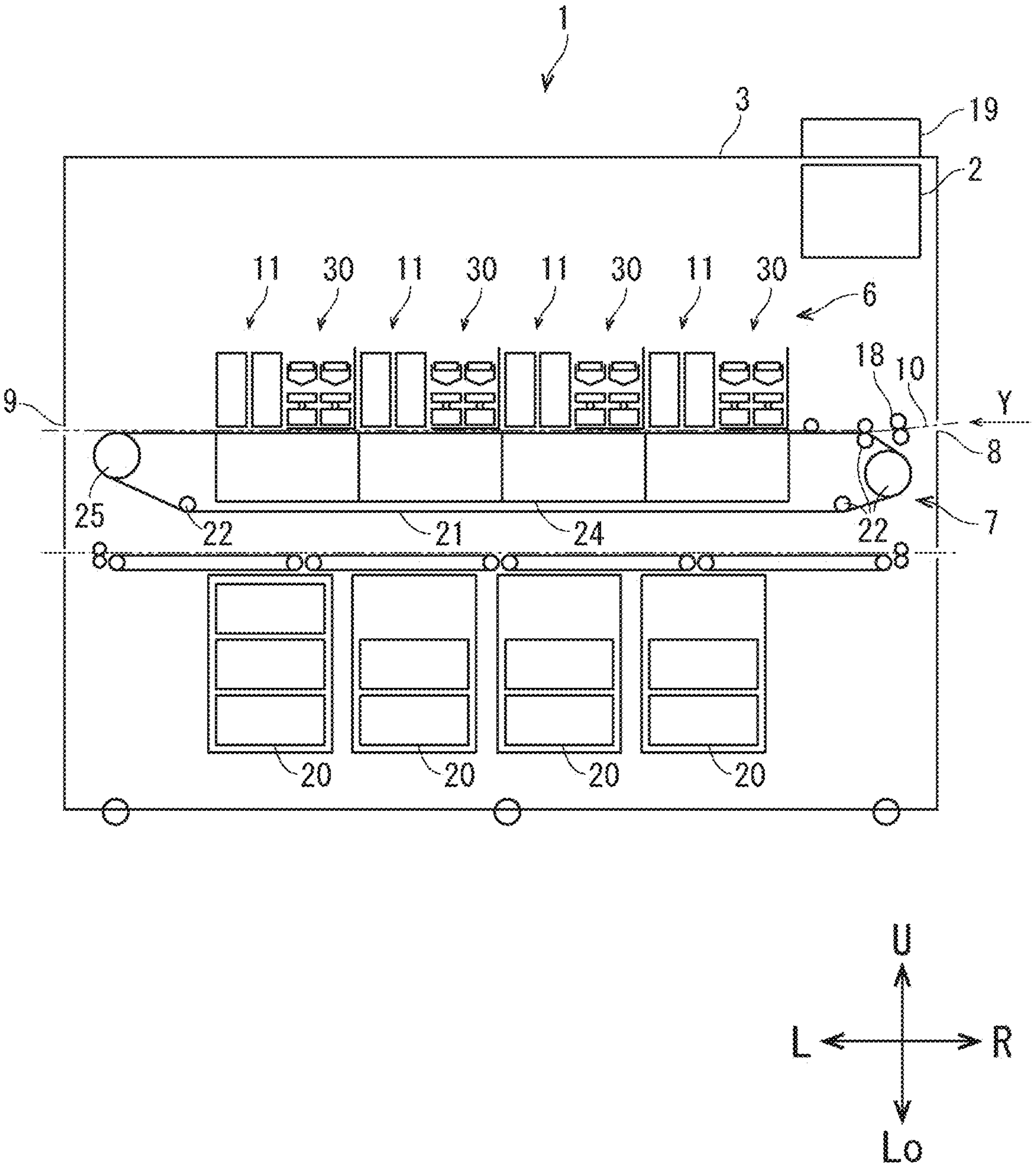
FIG. 2 is a fontal view schematically showing an internal structure of an ink-jet recording apparatus.
Figure 3:
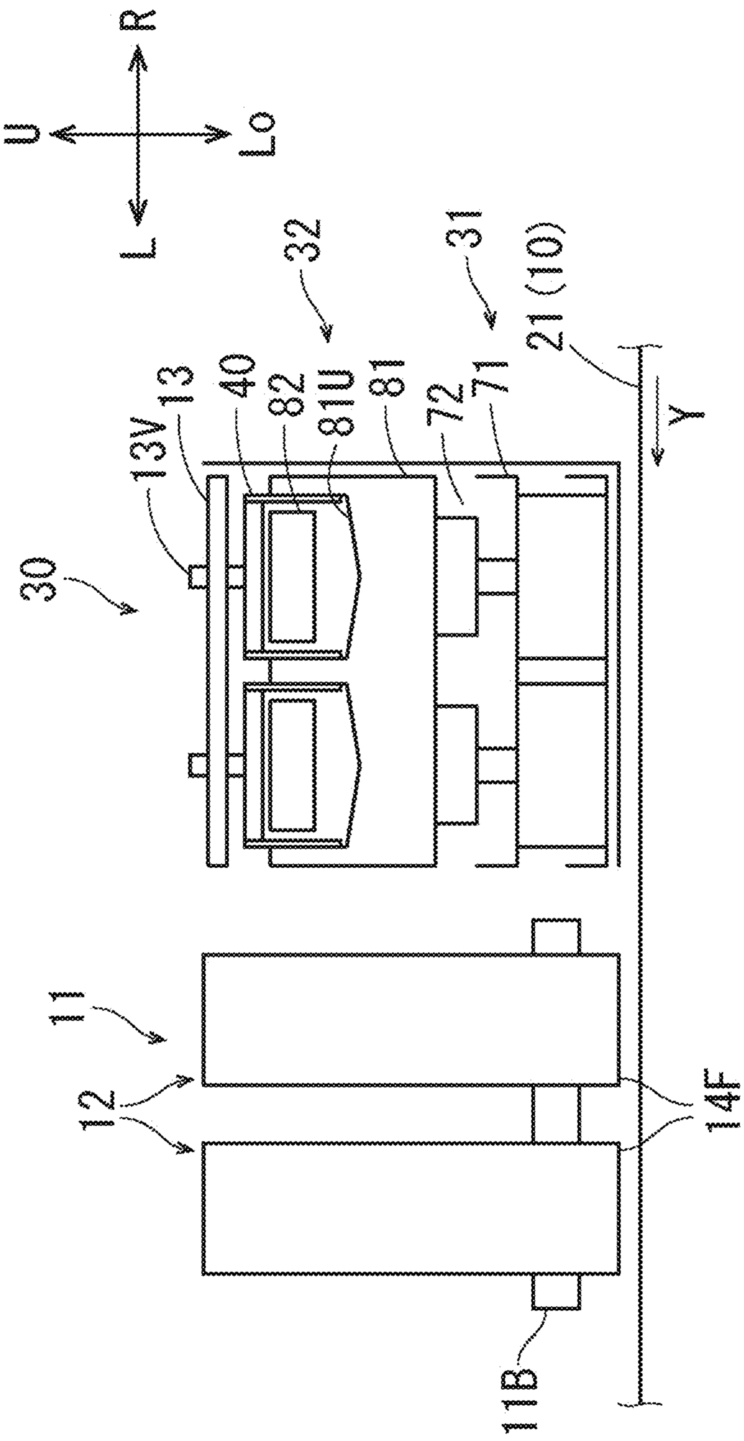
FIG. 3 is a frontal view schematically showing a head unit and a maintenance device.
Figure 4:
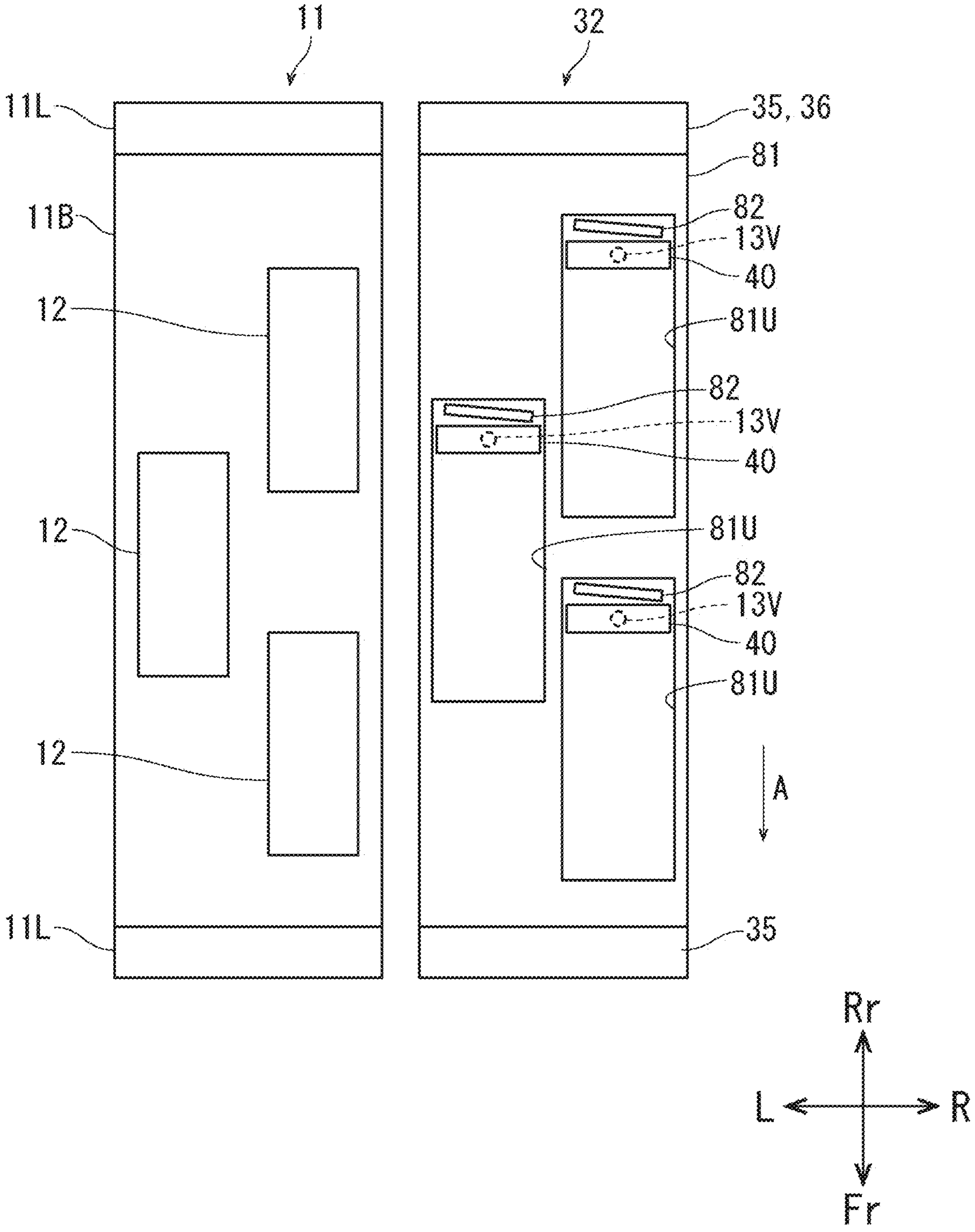
FIG. 4 is a plan view schematically showing the head unit and a wiping unit.
Figure 5:
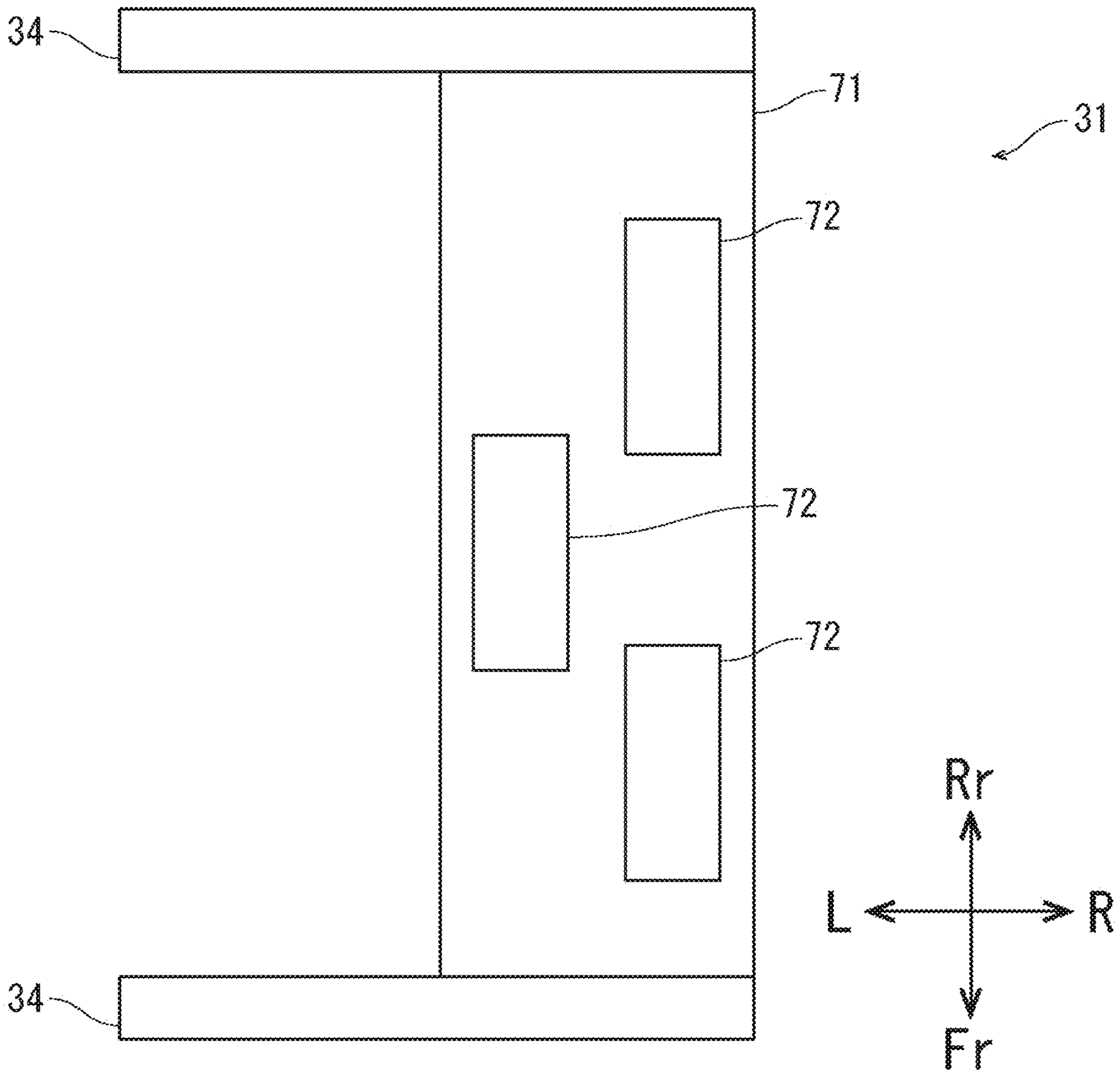
FIG. 5 is a plan view schematically showing a capping unit.
Figure 6:
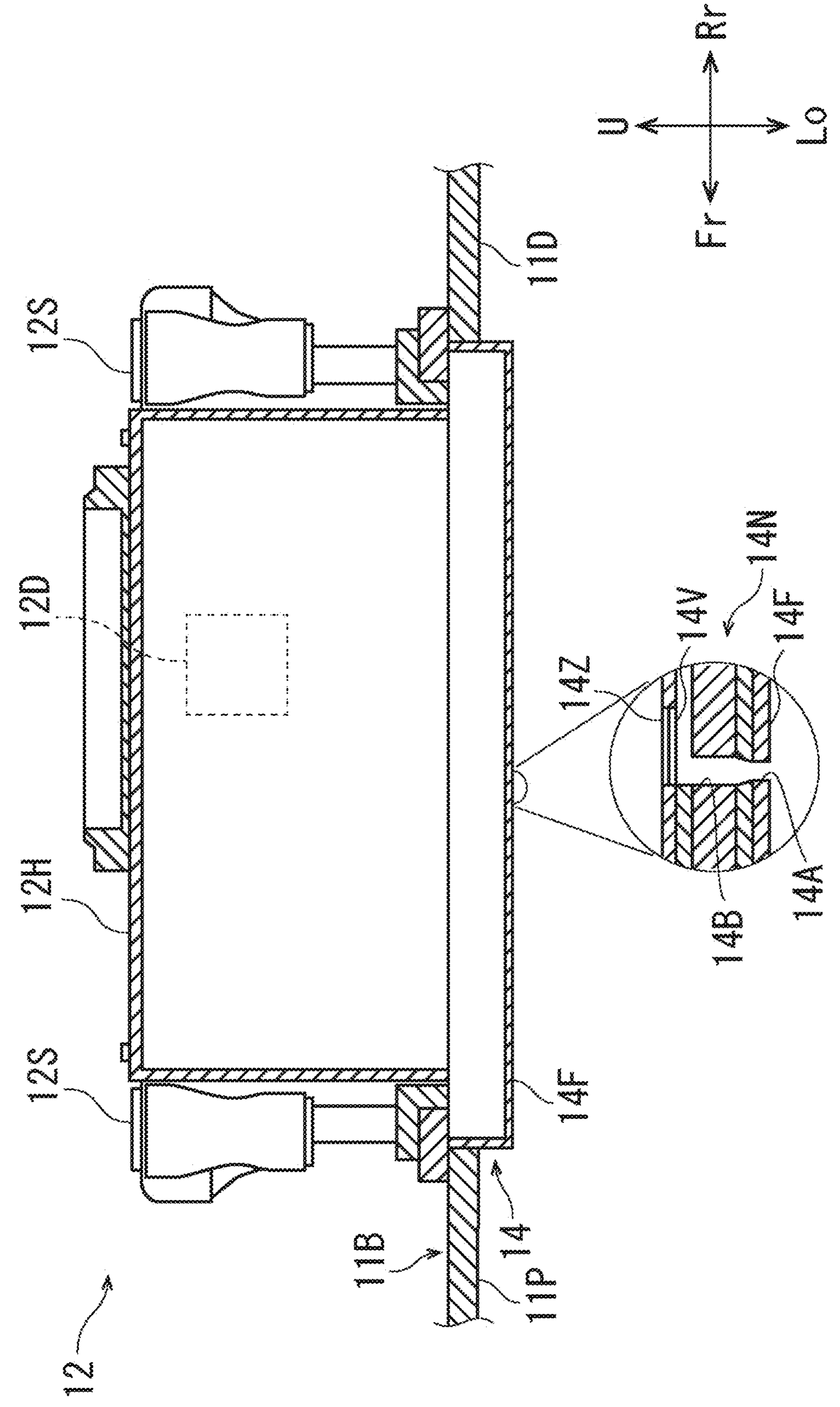
FIG. 6 is a cross-sectional view showing an ink-jet head.

FIG. 1 is a perspective view showing an appearance of an image formation system 100. FIG. 2 is a fontal view schematically showing an internal structure of the ink-jet recording apparatus 1. FIG. 3 is a frontal view schematically showing a head unit 11 and a maintenance device 30. FIG. 4 is a plan view schematically showing the head unit 11 and a wiping unit 32. FIG. 5 is a plan view schematically showing a capping unit 31. FIG. 6 is a cross-sectional view showing an ink-jet head 12. Hereinafter, the description will be given by defining the front side of the plane of the drawing of FIG. 2 as the front side of the ink-jet recording apparatus 1 and determining the right and left of the ink-jet recording apparatus 1 based on the direction with respect to the ink-jet recording apparatus 1 as viewed from its front. In the figures, the symbols U, Lo, L, R, Fr, and Rr represent upper, lower, left, right, front, and rear, respectively.

An image formation system 100 (see FIG. 1) includes a sheet feeder 110, the ink-jet recording apparatus 1, a drying apparatus 120, and a post-processing apparatus 130. The sheet feeder 110 accommodates thousands of sheets and supplies a sheet to the ink-jet recording apparatus 1. The ink-jet recording apparatus 1 forms an image on the sheet in an ink-jet printing method. The drying apparatus 120 applies heat to the sheet conveyed from the ink-jet recording apparatus 1 to dry the ink on the sheet. The post-processing apparatus 130 subjects the sheet conveyed from the drying apparatus 120 to post-processing, such as punching, stapling or folding.

The ink-jet recording apparatus 1 (see FIG. 2) includes a body housing 3 in the shape of a rectangular parallelepiped. In the center of the interior of the body housing 3, a conveyance unit 7 is provided that attracts a sheet by suction and conveys it in a direction Y. Above the conveyance unit 7, an image making unit 6 is provided that discharges ink to form an image. In a right side surface of the body housing 3, a sheet feed port 8 is provided through which a sheet is to be introduced from the sheet feeder 110 into the body housing 3. In a left side surface of the body housing 3, an ejection port 9 is provided through which the sheet with an image formed thereon is to be ejected to the drying apparatus 120. In the interior of the body housing 3, a conveyance path 10 is provided that extends from the sheet feed port 8 through a space between the conveyance unit 7 and the image making unit 6 to the ejection port 9. A registration roller 18 is provided upstream of the conveyance unit 7 in the conveyance direction Y.

The conveyance unit 7 includes an endless conveying belt 21 and a suction device 24. The conveying belt 21 has a large number of air holes and is wound around a drive roller and driven rollers 22. The top surface of the suction device 24 has a large number of air holes and contacts the inner surface of the conveying belt 21. The suction device 24 suctions air through the air holes in the conveying belt 21 and the air holes in the suction device 24, thus allowing a sheet to be attracted by suction to the conveying belt 21. A drive device including a motor and a reduction gear drives the drive roller 25 counterclockwise to rotate the conveying belt 21 counterclockwise, thus allowing the sheet attracted to the conveying belt 21 to be conveyed in the direction Y.

The image making unit 6 includes a plurality of (four in this embodiment) head units 11. Each of the head units 11 (see FIGS. 3 and 4) include one or more (three in this embodiment) ink-jet heads 12. The head units 11 are connected each to one of four ink containers 20 filled with black, cyan, magenta, and yellow inks, respectively.

The ink-jet head 12 (see FIG. 6) includes: a housing 12H in the shape of a rectangular parallelepiped the front-to-rear direction of which is a longitudinal direction thereof; a nozzle plate 14 provided at the bottom of the housing 12H; and a socket 12S connected to a pipe for supplying ink. The nozzle plate 14 includes a large number of nozzles 14N aligned in the front-to-rear direction. The nozzle 14N includes: a branched flow channel 14B branched from downstream of the socket 12S; and a discharge port 14A provided in a nozzle surface 14F being the bottom surface of the nozzle plate 14. A vibrating sheet 14V doubles as a portion of the inside wall of the branched flow channel 14B. The vibrating sheet 14V is provided with a pressurizing element 14Z. Examples of the pressurizing element 14Z that can be used include a piezoelectric element, a static actuator, and a heater. The pressurizing element 14Z is connected to a drive circuit 12D that drives the pressurizing element 14Z.

A controller 2 (see FIG. 2) includes an arithmetic device and a storage device. The arithmetic device is, for example, a CPU (central processing unit). The storage device includes a storage medium, such as a ROM (read only memory), a RAM (random access memory) or an EEPROM (electrically erasable programmable read only memory). The arithmetic device reads and executes a control program stored in the storage device, thus performing various types of processing. Alternatively, the controller 2 may be implemented by an integrated circuit without using any software.

A display and operation device 19 is provided at the top of the body housing 3 (see FIGS. 1 and 2). The display and operation device 19 includes: a display panel; a touch panel overlaid on the display panel; and a keypad. The controller 2 allows the display panel to display a screen showing an operation menu, the status or so on of the ink-jet recording apparatus 1 and controls each of components of the ink-jet recording apparatus 1 in response to an operation detected by the touch panel or the keypad.

A basic image forming operation of the ink-jet recording apparatus 1 is as follows. When an image formation job is input from the display and operation device 19, an external computer or so on to the ink-jet recording apparatus 1, the sheet feeder 110 feeds a sheet through the sheet feed port 8 to the conveyance path 10 and the registration roller 18 having stopped rotating corrects a skew of the sheet. When the registration roller 18 feeds the sheet to the conveyance unit 7 with a predetermined timing, the conveyance unit 7 attracts the sheet to the conveying belt 21 by suction and conveys it in the direction Y. Ink is discharged from the ink-jet heads 12 to the sheet and, thus, an image is formed on the sheet. The sheet with the image formed thereon is conveyed through the ejection port 9 to the drying apparatus 120.

[Maintenance Device]

Next, a description will be given of the maintenance device 30. The four head units 11 (see FIG. 2) have the same structure and the four maintenance devices 30 also have the same structure. Therefore, hereinafter, a description will be given of one head unit 11 and one maintenance device 30 that maintains the one head unit 11.

[Head Base]

The head unit 11 includes a head base 11B (see FIGS. 3, 4, and 6) that supports the ink-jet heads 12. Three ink-jet heads 12 are mounted in a staggered arrangement on the head base 11B. The head base 11B is an approximately rectangular plate-shaped member the front-to-rear direction of which is a longitudinal direction thereof. The head base 11B has through holes into which the respective nozzle plates 14 of the ink-jet heads 12 are fitted. The bottom surface of the head base 11B is a surface (hereinafter, referred to as a parallel surface 11P) parallel to the nozzle surfaces 14F. The nozzle surfaces 14F protrude below beyond the parallel surface 11P.

The maintenance device 30 (see FIG. 3) is provided lateral to the head unit 11 (upstream (to the right) of the head unit 11 in the conveyance direction Y in this embodiment). The maintenance device 30 includes a capping unit 31, a wiping unit 32, and a cleaning liquid supply source 13.

[Capping Unit]

The capping unit 31 (see FIGS. 3 and 5) includes the same number of (three in this embodiment) caps 72 as the ink-jet heads 12 included in the head unit 11. The three caps 72 are disposed in a staggered arrangement like the ink-jet heads 12 and supported by a frame 71.

[Wiping Unit]

The wiping unit 32 (see FIGS. 3 and 4) includes a waste liquid tray 81, blades 82, and cleaning liquid supply portions 40. The waste liquid tray 81 includes the same number of recesses 81U as the ink-jet heads 12 included in the head unit 11. The plurality of recesses 81U are disposed in a staggered arrangement like the ink-jet heads 12. One blade 82 and one cleaning liquid supply portion 40 are provided for each of the recesses 81U.

[Head Lift]

Figure 23:
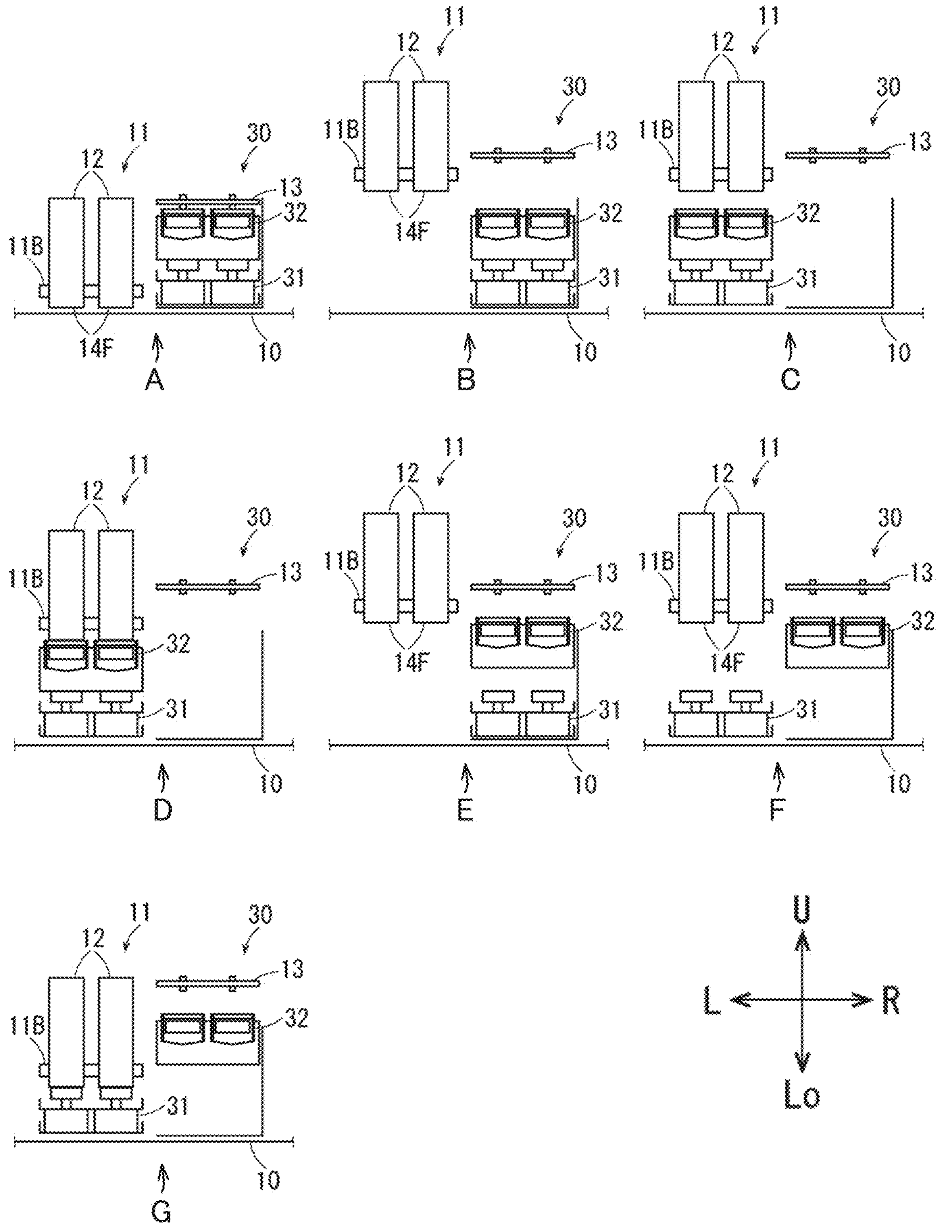
FIG. 23 shows frontal views illustrating the movement of the maintenance device.

FIG. 23 shows frontal views illustrating the movement of the maintenance device 30. The head lifts 11L (see FIG. 4)

are provided at the front and rear of the head base 11B. The head lift 11L is constituted by, for example, a ball screw or a belt drive. The head lifts 11L move the head unit 11 up and down from an image forming position (see A in FIG. 23) to a backward position (see B in FIG. 23) and vice versa. The image forming position is a position at which the distance between the conveyance path 10 (the top surface of the conveying belt 21) on which a sheet is to be conveyed and the nozzle surfaces 14F is a predetermined distance suitable for image formation. The backward position is a position that is located above the image forming position and where, in sliding the capping unit 31 and the wiping unit 32 horizontally using capper sliding devices 34 to be described hereinafter, the head unit 11 does not interfere with the wiping unit 32.

[Capper Sliding Device]

The capper sliding devices 34 (see FIG. 5) are provided at the front and rear of the frame 71 of the capping unit 31. The capper sliding device 34 is constituted by, for example, a ball screw or a belt drive. The capper sliding devices 34 slide the capping unit 31 from a home position (see A in FIG. 23) to a maintenance position (see F in FIG. 23) and vice versa. The home position is a position to the right of the head unit 11 located in the image forming position. The maintenance position is a position below the head unit 11 located in the backward position.

[Wiper Lift]

Wiper lifts 35 (see FIG. 4) are provided at the front and rear of the waste liquid tray 81 of the wiping unit 32. The wiper lift 35 is constituted by, for example, a cam mechanism or a ball screw. The wiper lifts 35 move the wiping unit 32 up and down from a contact position (see B in FIG. 23) to a separated position (see E in FIG. 23) and vice versa. The contact position is a position where the waste liquid tray 81 contacts the caps 72. The separated position is a position where the waste liquid tray 81 is separated a predetermined distance above the caps 72.

While the wiping unit 32 is located at the contact position, the wiping unit 32 is placed on the capping unit 31 and, therefore, upon actuation of the capper sliding devices 34, the wiping unit 32 slides, together with the capping unit 31, between the home position and the maintenance position. In other words, the capper sliding devices 34 also act as wiper sliding devices that slide the wiping unit 32 between the home position and the maintenance position. When the capper sliding devices 34 are actuated while the wiping unit 32 is located at the separated position, the capper sliding devices 34 slide the capping unit 31 alone between the home position and the maintenance position while leaving the wiping unit 32 at the home position.

[Wiping Unit]

Figure 7:
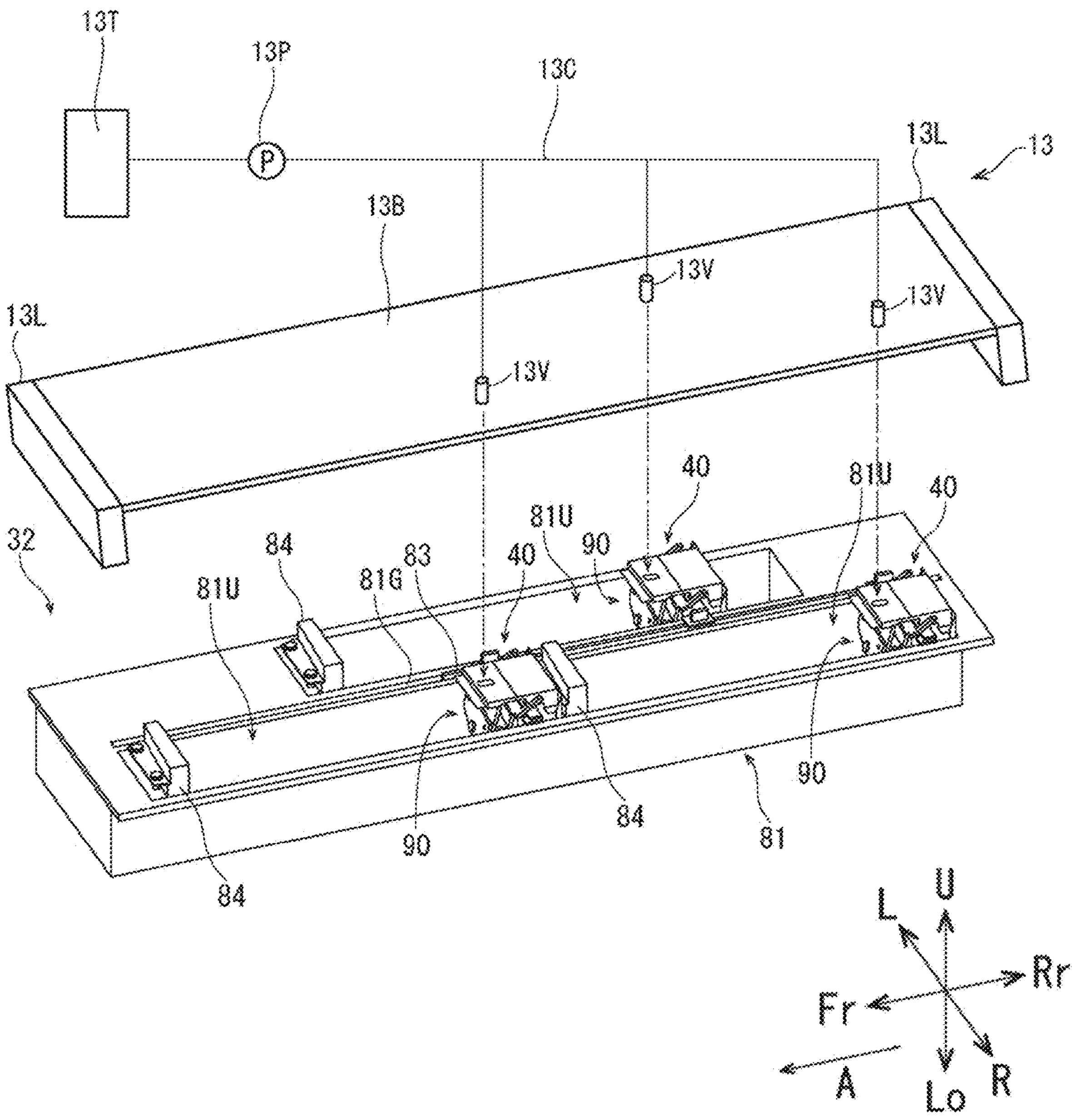
FIG. 7 is a perspective view showing the wiping unit and a cleaning liquid supply source.
Figure 8:
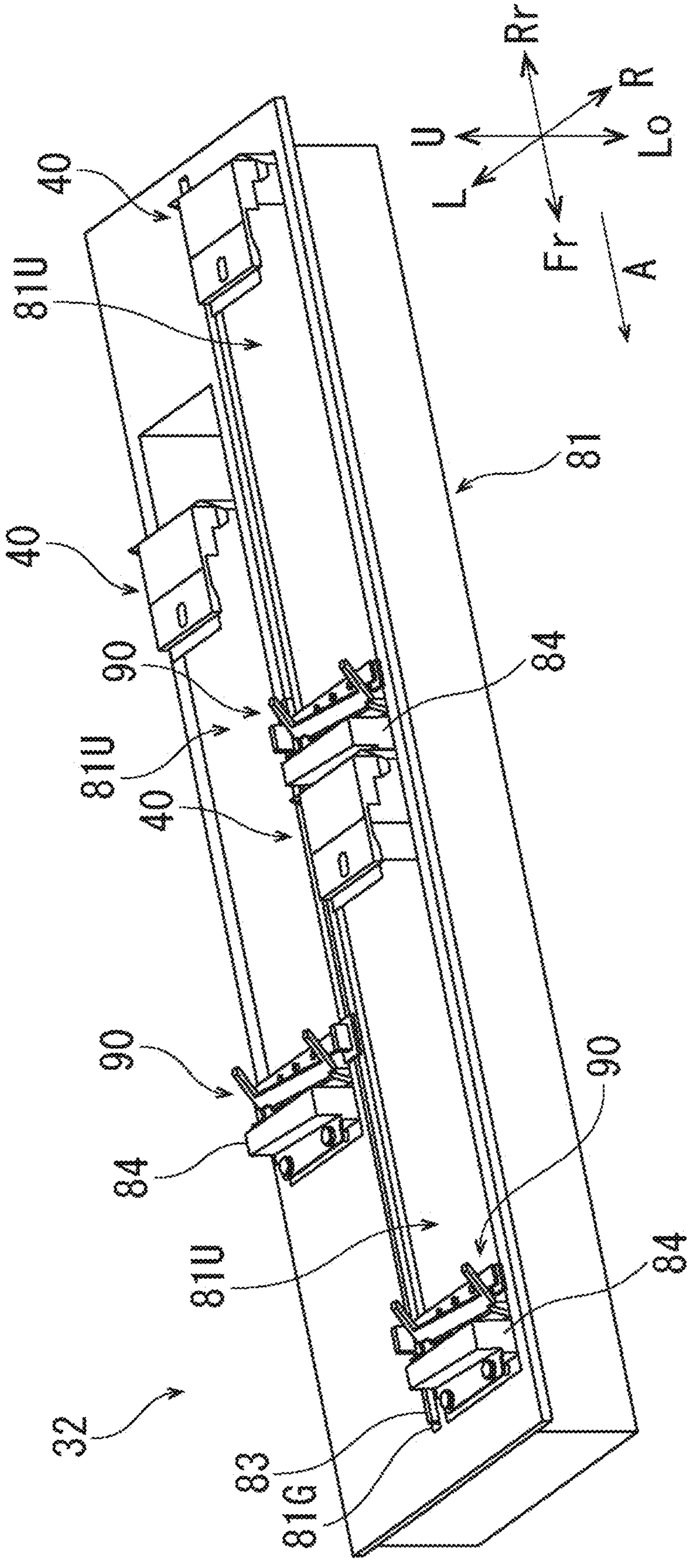
FIG. 8 is a perspective view showing the wiping unit.
Figure 9:
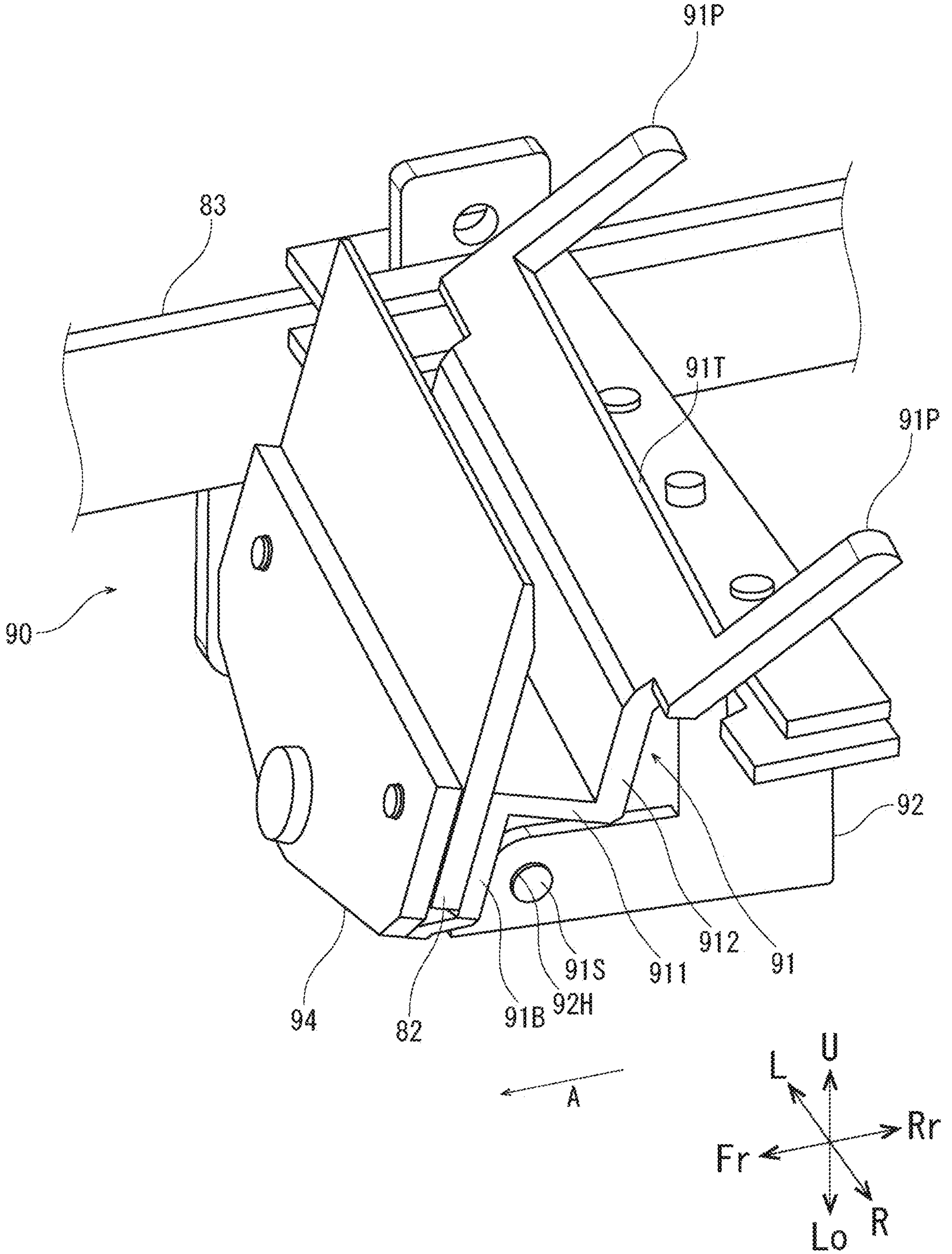
FIG. 9 is a perspective view showing a blade unit.
Figure 10:
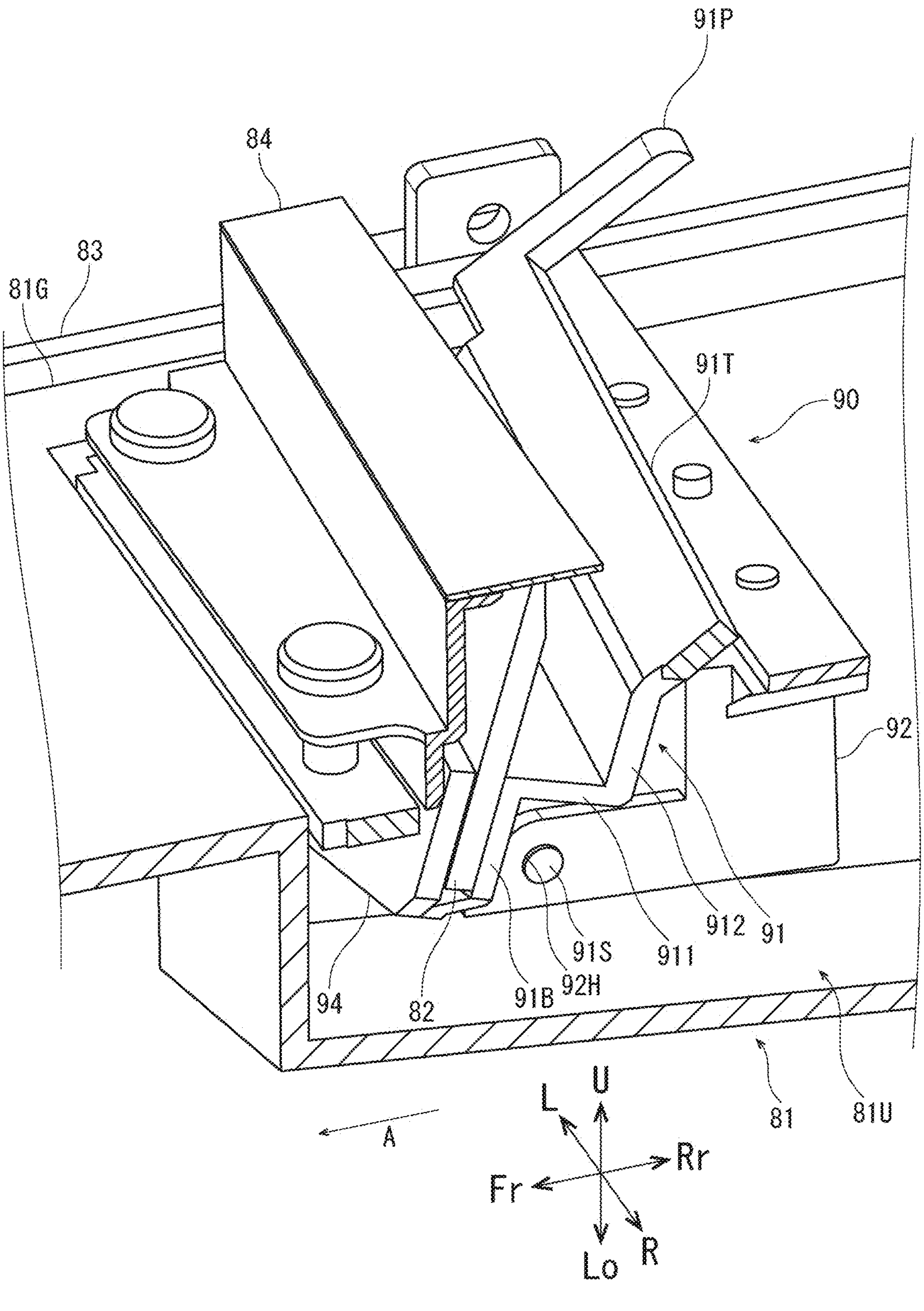
FIG. 10 is a perspective view showing a cross-section of the blade unit.
Figure 11:
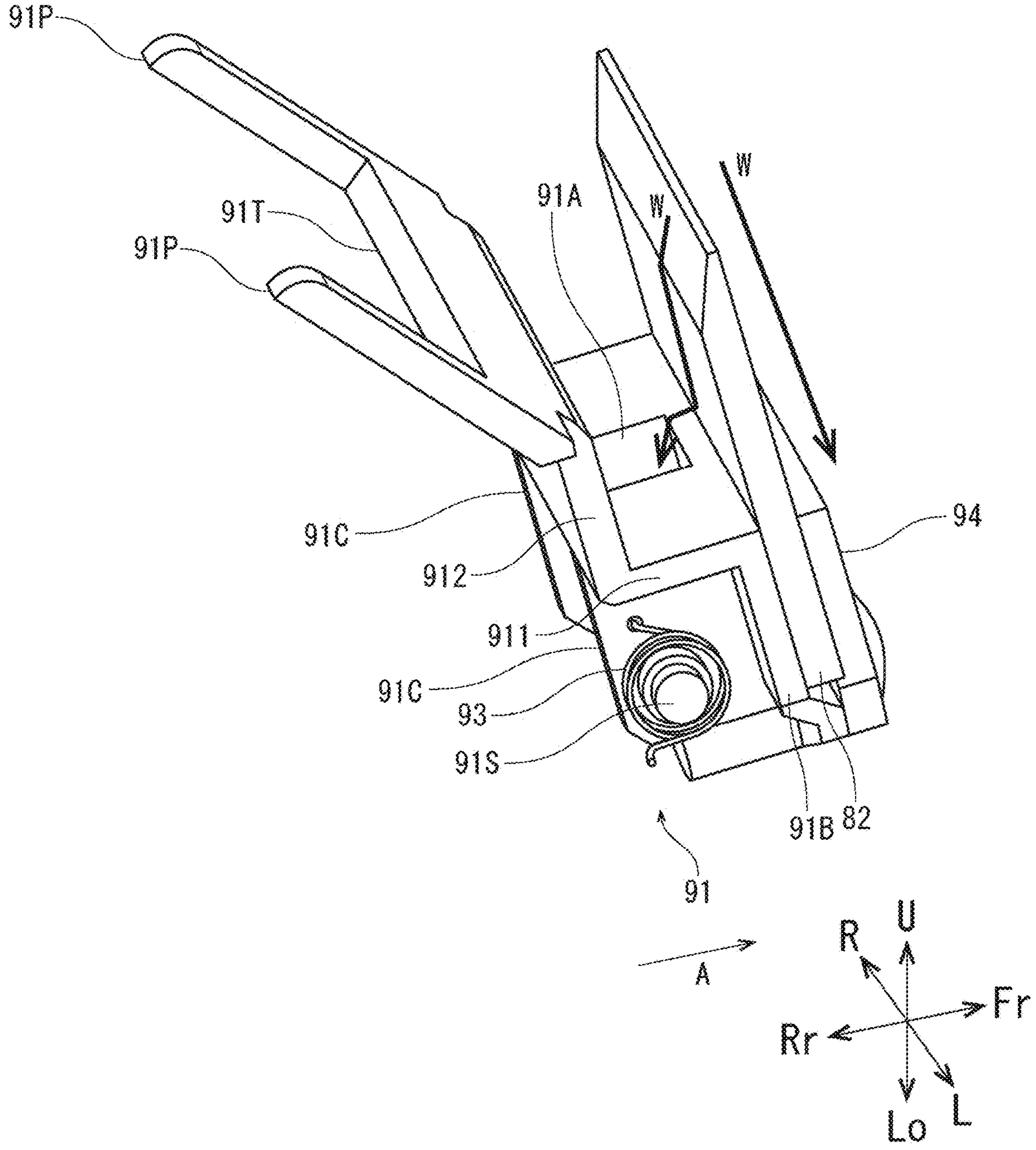
FIG. 11 is a perspective view showing a projecting member and the blade.
Figure 12:
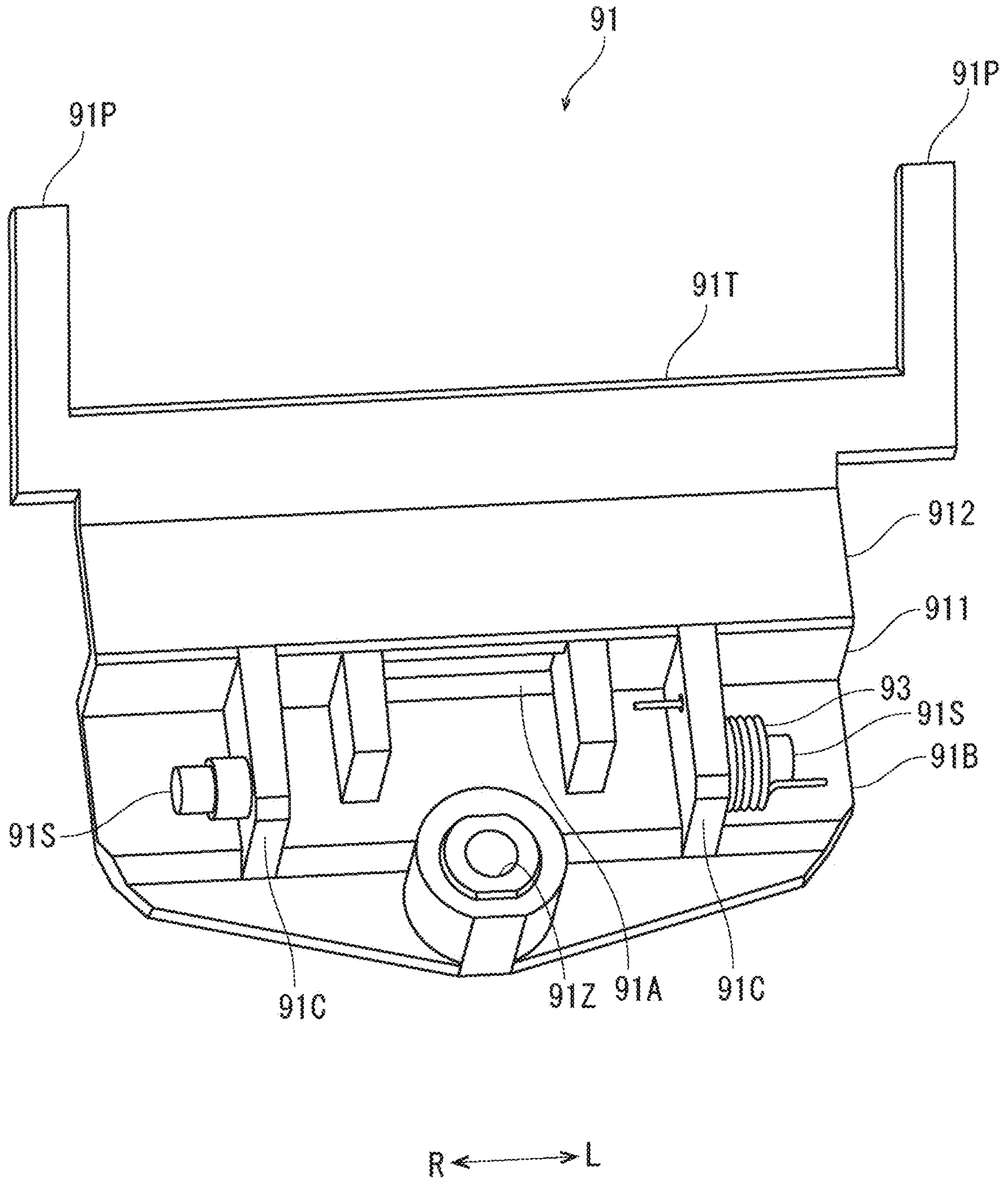
FIG. 12 is a perspective view showing the projecting member.

Next, a detailed description will be given of the structure of the wiping unit 32. FIG. 7 is a perspective view showing the wiping unit 32 and the cleaning liquid supply source 13. FIG. 8 is a perspective view showing the wiping unit 32. FIG. 9 is a perspective view showing a blade unit 90. FIG. 10 is a perspective view showing a cross-section of the blade unit 90. FIG. 11 is a perspective view showing a projecting member 91 and the blade 82. FIG. 12 is a perspective view showing the projecting member 91.

The wiping unit 32 (see FIG. 7) includes a plurality of (three in this embodiment) blade units 90, the waste liquid tray 81, and a carriage 83. The blade unit 90 (see FIGS. 9 to 12) includes the blade 82, a projecting member 91, holders 92, and a first biasing member 93.

[Blade]

The blade 82 (see FIGS. 9 to 11) is an appropriately rectangular plate-shaped, flexible member made of resin or the like. The blade 82 has a thickness in the front-to-rear direction and is held by the holders 92 while tilting slightly rearward. The width of the blade 82 in the right-to-left direction is greater than the width of the nozzle surface 14F. An upper portion of the blade 82 is tapered to gradually reduce the thickness toward a top edge of the blade 82.

[Projecting Member]

The projecting member 91 (see FIGS. 9 to 12) is provided unitarily with the blade 82. The projecting member 91 includes: a basal portion 91B parallel to the blade 82; a first bent portion 911 bent rearward from an upper end of the basal portion 91B; a second bent portion 912 bent upward from a rear end of the first bent portion 911; a rearwardly tilted portion 91T tilted more rearward than the second bent portion 912; and projecting portions 91P projecting upward from the right and left ends of the rearwardly tilted portion 91T and tilted rearward at a tilt angle equal to the rearwardly tilted portion 91T.

The width of the basal portion 91B in the right-to-left direction is equal to the width of the blade 82. The length of the basal portion 91B in the upper and lower direction is shorter than the length of the blade 82 in the upper and lower direction. The basal portion 91B is joined to a lower portion of the rear surface of the blade 82. The width of each of the first bent portion 911 and the second bent portion 912 in the right-to-left direction is equal to the width of the basal portion 91B. The width of the rearwardly tilted portion 91T in the right-to-left direction is wider than the width of the basal portion 91B. The positions of the projecting portions 91P in the right-to-left direction are set at positions where the distal ends of the projecting portions 91P are contactable with portions of the parallel surface 11P located on the right and left side of the nozzle surface 14F.

The rear surface of the basal portion 91B is provided with two wall portions 91C opposed to each other in the right-to-left direction (see FIGS. 11 and 12). The left surface of the left wall portion 91C is provided with a shaft 91S projecting leftward. The right surface of the right wall portion 91C is provided with a shaft 91S projecting rightward.

The central portion of the first bent portion 911 in the right-to-left direction is provided with a through hole 91A penetrating the first bent portion 911 downward (see FIGS. 11 and 12). At least part of waste liquid W (a mixture of ink and cleaning liquid) having flowed down the rear surface of the blade 82 passes through the through hole 91A and falls.

[Fixing Member]

A fixing member 94 (see FIGS. 9 to 11) fixes the blade 82 to the projecting member 91. A lower portion of the blade 82 is sandwiched between the basal portion 91B of the projecting member 91 and the fixing member 94 and the fixing member 94 is fastened through a screw hole 91Z (see FIG. 12) to the projecting member 91 by screw-threaded engagement. The lower edge of the fixing member 94 and the lower edge of the projecting member 91 are tapered to gradually downwardly reduce their width in the right-to-left direction (see FIGS. 9 to 12). The waste liquid W having flowed down the front surface of the blade 82 to the front surface of the fixing member 94 flows along the lower edge of the fixing member 94 and the lower edge of the projecting member 91, then concentrates to the center thereof in the right-to-left direction, and then falls into the recess 81U of the waste liquid tray 81.

[Holder]

The holders 92 (see FIGS. 9 to 11) hold the blade 82 through the projecting member 91. Respective lower portions of the holders 92 are provided with respective shaft holes 92H through which the respective shafts 91S of the projecting member 91 are to be inserted. The projecting member 91 is rockable in the front-to-rear direction about the shafts 91S. The blade 82 rocks together with the projecting member 91. The blade 82 and the projecting member 91 are mounted, in a tilted manner with respect to the right-to-left direction, to the holders 92 to allow the waste liquid W to flow either to the right or to the left. Although in the example shown in the figures the blade 82 is tilted to locate its left end slightly rearward relative to its right end, the blade 82 may be tilted in a reverse manner.

[First Biasing Member]

The first biasing member 93 (see FIGS. 11 and 12) is, for example, a torsion coil spring and wrapped around the shaft 91S. The first biasing member 93 is anchored at one end to the holder 92 and at the other end to the projecting member 91. The first biasing member 93 biases the projecting member 91 counterclockwise in FIGS. 9 and 10 and clockwise in FIG. 11. In other words, the first biasing member 93 biases the blade 82 toward pressing the top edge of the blade 82 against the nozzle surface 14F. Alternatively, the first biasing member 93 may be a leaf spring, a compression spring or others.

[Waste Liquid Tray]

The waste liquid tray 81 (see FIGS. 7 and 8) is formed as a whole in a rectangular shape the front-to-rear direction of which is a longitudinal direction thereof. The waste liquid tray 81 includes three upwardly opening recesses 81U. The three recesses 81U are disposed in a staggered arrangement like the ink-jet heads 12. The recesses 81U are formed in a rectangular shape elongated in the front-to-rear direction as viewed from above. The length of the recess 81U in the front-to-rear direction is greater than that of the nozzle surface 14F and the width thereof in the right-to-left direction is greater than that of the nozzle surface 14F. The recesses 81U receive the waste liquid W containing ink and cleaning liquid.

[Carriage]

The carriage 83 (see FIGS. 7 to 10) is formed in a plate-like shape the front-to-rear direction of which is a longitudinal direction thereof. A groove 81G is provided along the front-to-rear direction between the right and left recesses 81U and the carriage 83 is inserted into the groove 81G. The length of the carriage 83 in the front-to-rear direction is smaller than the length of the groove 81G in the front-to-rear direction. The carriage 83 is slidable in the front-to-rear direction along the groove 81G.

The three recesses 81U accommodate the respective blade units 90. The three blade units 90 are connected to the carriage 83. The three blade units 90 are arranged with respect to the carriage 83 to allow the three blade units 90 to be located rearward of the respective associated nozzle surfaces 14F when the carriage 83 is located at its rearmost position.

[Carriage Drive Device]

The waste liquid tray 81 is provided with a carriage drive device 36 (see FIG. 4). The carriage drive device 36 is constituted by, for example, a belt drive device or a feed screw and slides the carriage 83 along the groove 81G to thus slide the blades 82. By sliding the blades 82 frontward (an example of the forward direction A of the wiping action), the wiping action of the blades 82 scraping away ink from the respective associated nozzle surfaces 14F is performed. FIG. 7 shows a state where the blade 82 is located at a wiping action start position. FIG. 8 shows a state where the blade 82 is located at a wiping action end position.

[Receipt Member]

Figure 13:
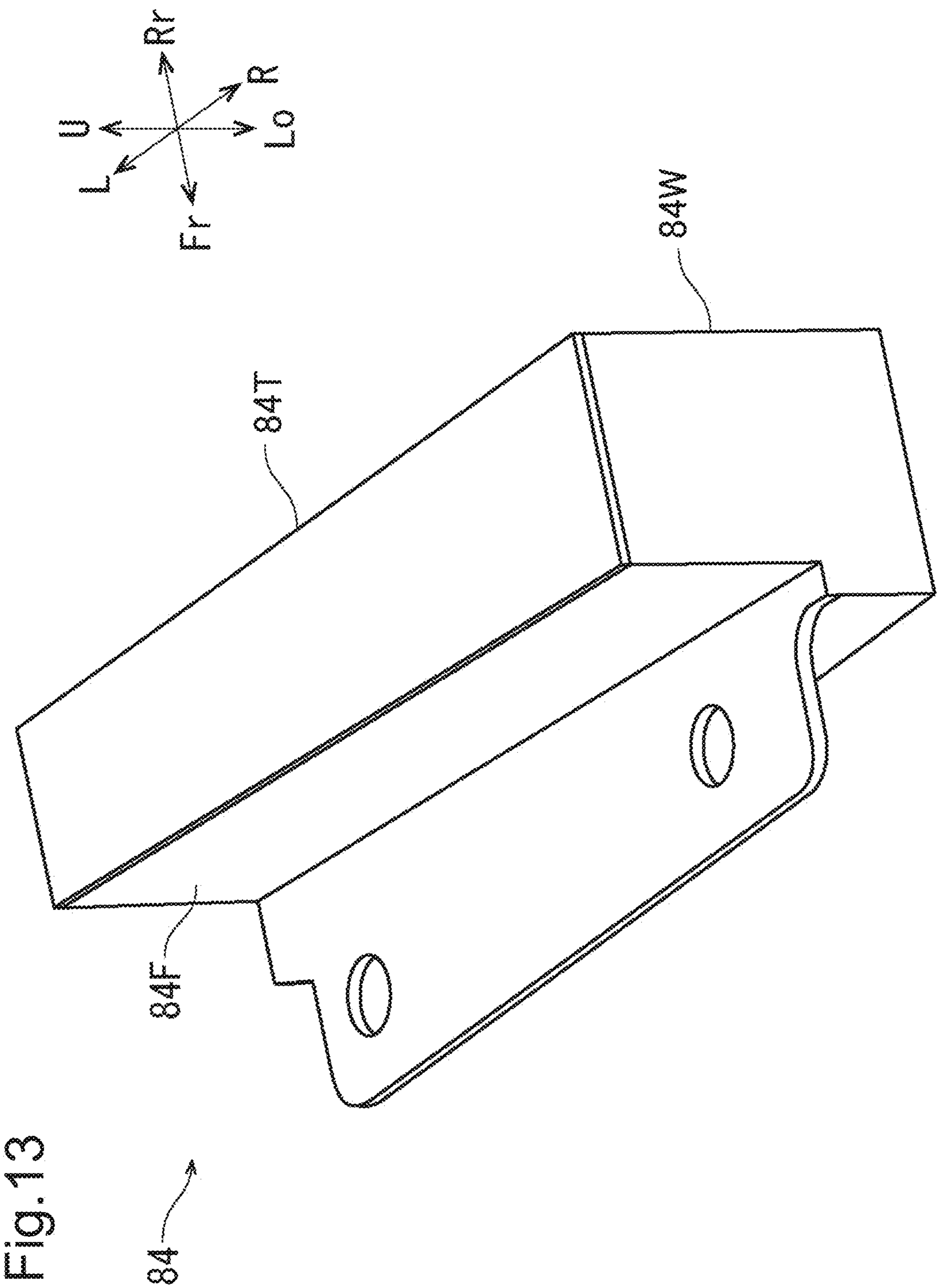
FIGS. 13 and 14 are perspective views showing a receipt member.
Figure 14:
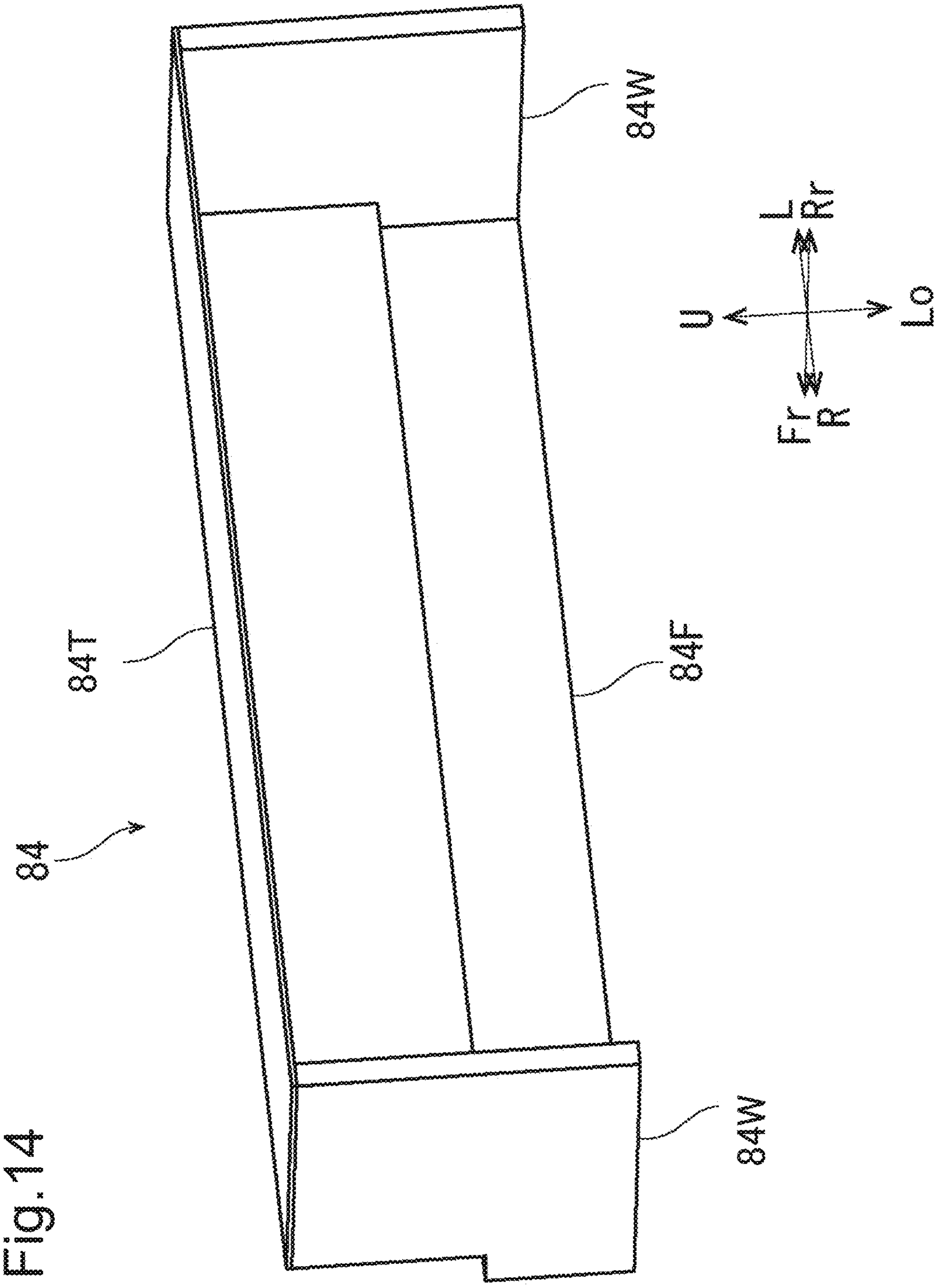

FIGS. 13 and 14 are perspective views showing a receipt member 84. The receipt members 84 are supported by the waste liquid tray 81 (see FIGS. 7, 8, and 10). Three receipt members 84 are provided at the respective front ends of the three recesses 81U. Each of the receipt members 84 includes: a front portion 84F opposed to the front surface of the blade 82; a top portion 84T provided to extend rearward from the top end of the front portion 84F; and sidewall portions 84W to extend rearward from the right and left ends of the front portion 84F. Therefore, the receipt member 84 is formed in the shape of an open-rear and open-bottom box.

When the blades 82 reach the frontmost ends of the respective associated recesses 81U, the blades 82 are accommodated in the respective associated receipt members 84. At this time, each blade 82 is enclosed from front, above, and right and left by the receipt member 84. Alternatively, the receipt member 84 may include either the top portion 84T or the sidewall portions 84W.

[Cleaning Liquid Supply Portion]

Figure 15:
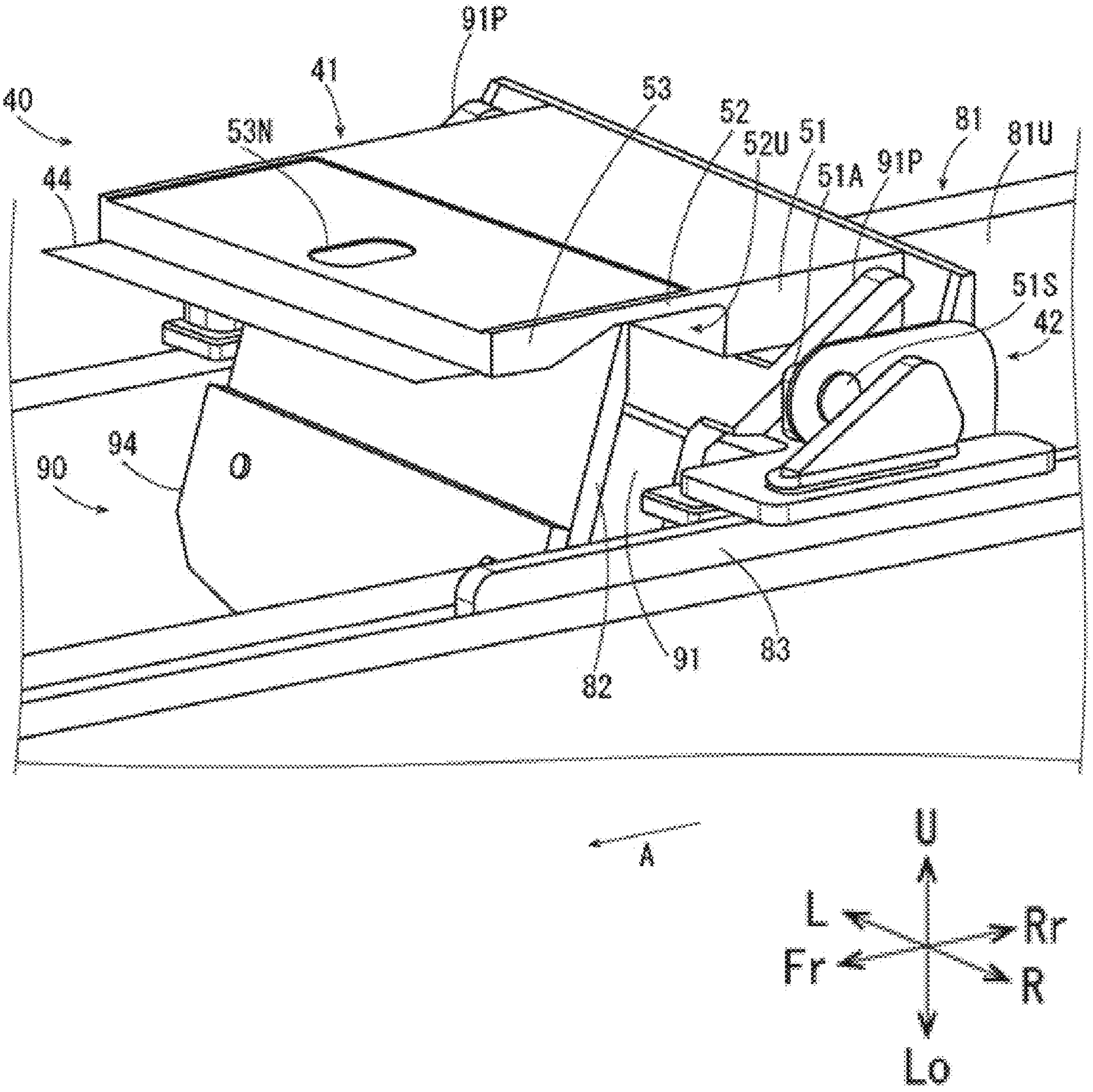
FIG. 15 is a perspective view showing a cleaning liquid supply portion and the blade unit.
Figure 16:
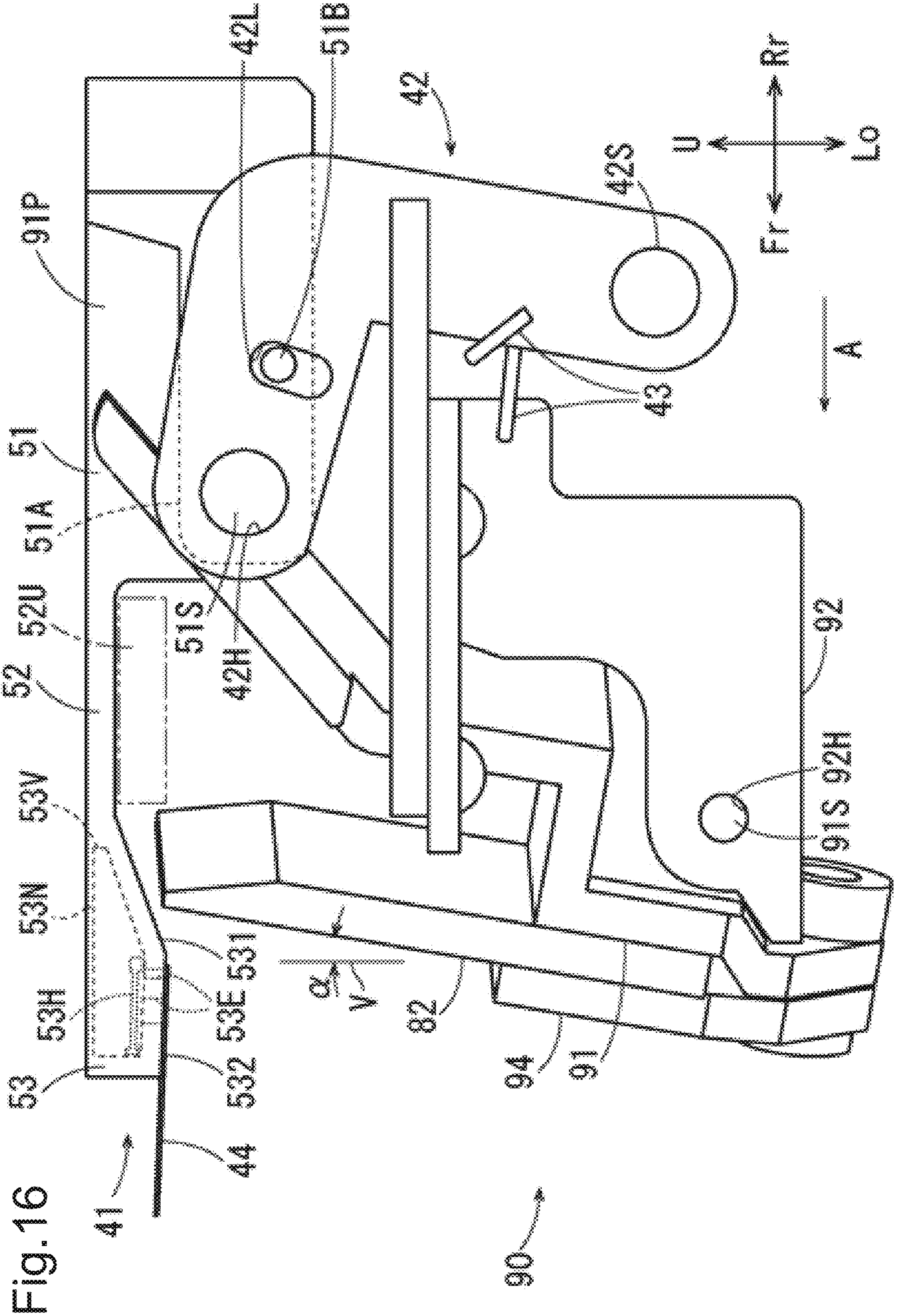
FIGS. 16 and 17 are right side views showing the cleaning liquid supply portion and the blade unit.
Figure 17:
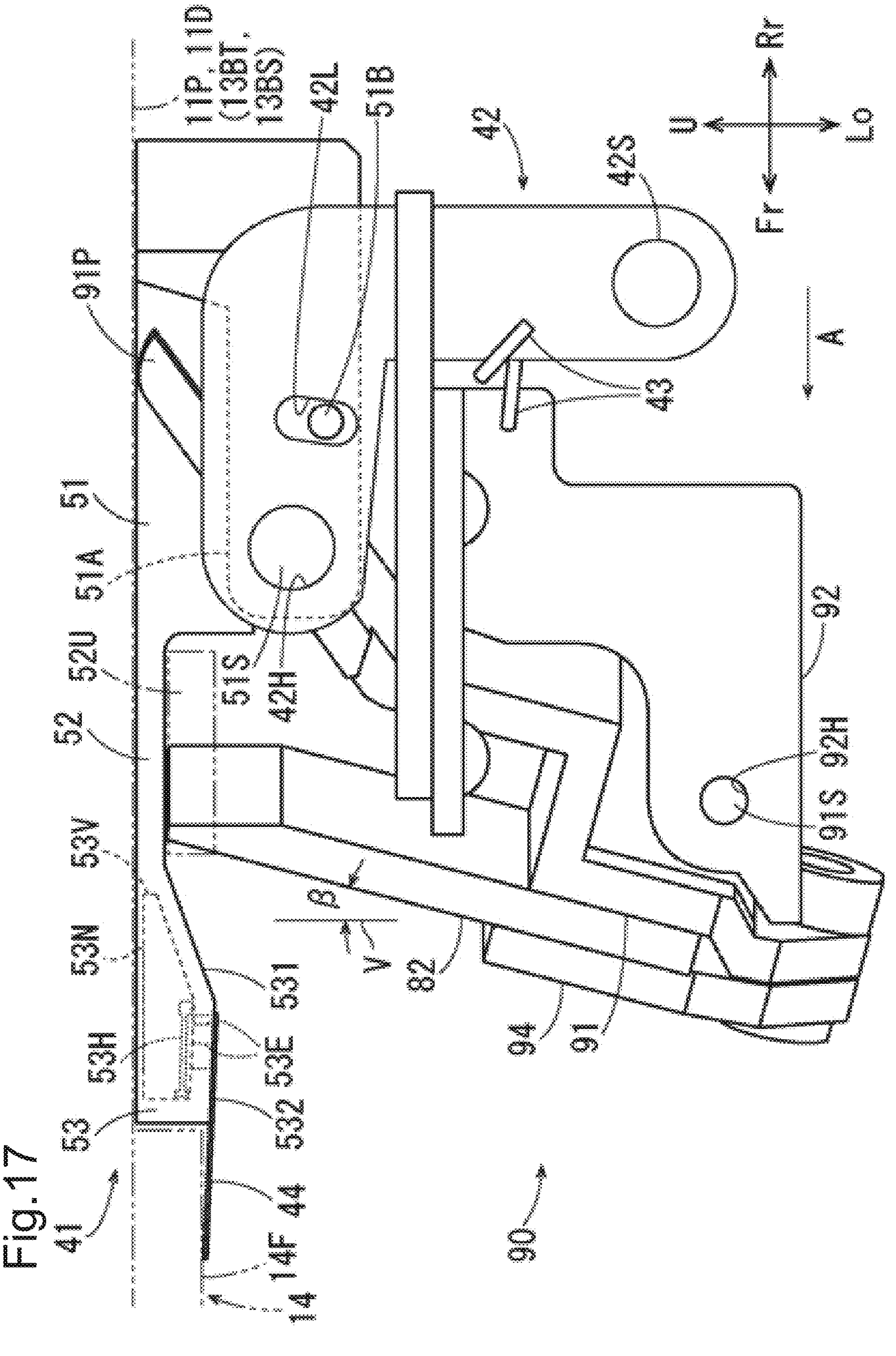
Figure 18:
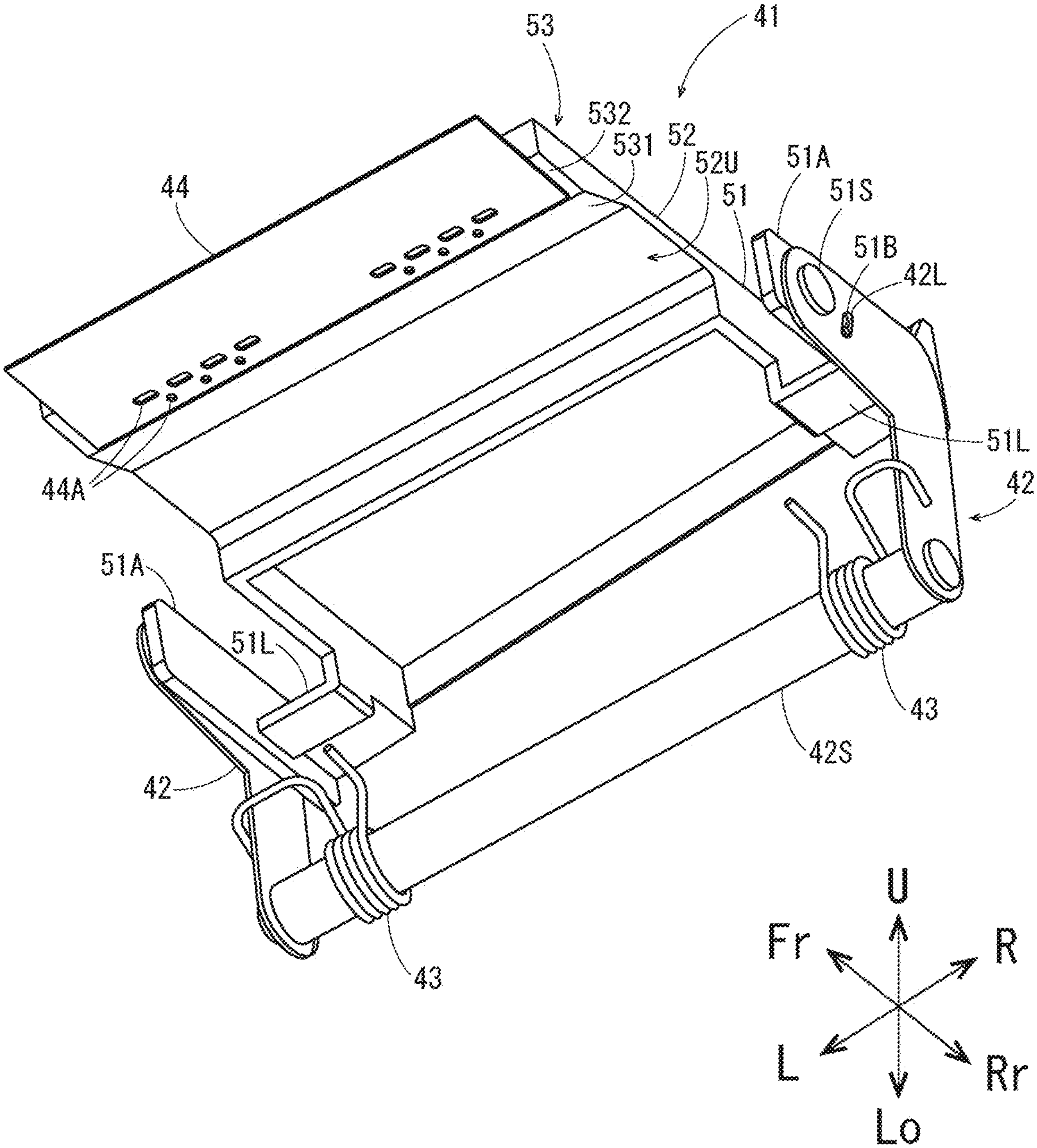
FIG. 18 is a perspective view showing the cleaning liquid supply portion.

Next, a description will be given of the cleaning liquid supply portion 40. FIG. 15 is a perspective view showing the cleaning liquid supply portion 40 and the blade unit 90. FIGS. 16 and 17 are right side views showing the cleaning liquid supply portion 40 and the blade unit 90. FIG. 18 is a perspective view showing the cleaning liquid supply portion 40. FIGS. 19 to 22 are perspective views showing cross-sections of the cleaning liquid supply portion 40 and the cleaning liquid supply source 13. The cleaning liquid supply portion 40 includes a supply member 41, link members 42, and a transfer member 44.

[Supply Member]

The supply member 41 includes, in order from rear to front, a basal end portion 51, an intermediate portion 52, and a container portion 53. The top surface of the supply member 41 is flat and has a rectangular shape as viewed from above. Respective portions of the parallel surface 11P of the head base 11B located rearward of the respective nozzle plates 14 face the top surfaces of the respective supply members 41 and double as pressing portions 11D that press down the respective associated supply members 41. Alternatively, the pressing portions 11D may be provided as separate members from the head base 11B.

The basal end portion 51 is provided at its right and left side surfaces with respective arm supports 51L extending to the right and left (see FIG. 18). The right and left arm supports 51L are provided with respective arms 51A projecting frontward (see FIGS. 16 to 18). The right side surface of the right arm 51A and the left side surface of the left arm 51A are provided with respective shafts 51S projecting from them. The right side surface of the right arm 51A and the left side surface of the left arm 51A are further provided with respective bosses 51B projecting from them rearward of the right and left shafts 51S.

Thickness of the intermediate portion 52 in the upper and lower direction is smaller than that of the basal end portion 51 (see FIGS. 16 to 18). The bottom surface of the intermediate portion 52 is flat. The bottom surface of the container portion 53 has a first slope 531 and a second slope 532 provided frontward of the first slope 531. The first slope 531 is inclined with the front lower than the rear (see FIGS. 16 and 17). The second slope 532 is inclined with the front higher than the rear. The first slope 531 continues to the bottom surface of the intermediate portion 52. By the above configuration, there is formed below the intermediate portion 52 a space (hereinafter, referred to as a non-contact space 52U) wider than below the container portion 53.

The container portion 53 has a hollow structure having a container space 53V that contains a cleaning liquid (see FIGS. 16 and 17). The interior of the container space 53V is preferably provided with a cleaning liquid holding member 53H (see FIGS. 21 and 22), such as a net member or a porous member, that holds the cleaning liquid. An intake port 53N (see FIGS. 15, 21, and 22) through which the cleaning liquid is to be introduced into the container portion 53 is formed in the top surface of the container portion 53. Discharge ports 53E (see FIGS. 16 and 17) through which the cleaning liquid is to be discharged are formed in the bottom surface of the container portion 53. The thickness of the container portion 53 in the upper and lower direction at its front end (the distance from the front end of the second slope 532 to the top surface of the container portion 53) is slightly greater than the distance from the bottom surface of the head base 11B to the nozzle surface 14F.

[Link Member]

Respective link members 42 are provided on the right and left sides of each of the supply members 41 (see FIGS. 16 to 18). The right and left link members 42 are connected at their lower portions to each other by a shaft 42S (see FIG. 18) the right-to-left direction of which is a longitudinal direction thereof. The shaft 42S is supported rotatably by the associated recess 81U of the waste liquid tray 81. Specifically, respective cutaways 81K are formed in the right and left sidewalls of each of the recesses 81U of the waste liquid tray 81 to extend downward from the upper ends of the sidewalls (see FIGS. 19 and 20). The right and left ends of the shaft 42S are supported by the cutaways 81K in the right and left sidewalls. The right and left link members 42 are rockable about the shaft 42S.

Respective upper portions of the right and left link members 42 are provided with respective shaft holes 42H that receive the respective shafts 51S of the associated supply member 41 (see FIGS. 16 to 18). The shaft holes 42H are disposed frontward of the shafts 42S. Respective elongated holes 42L that receive the respective bosses 51B of the associated supply member 41 are formed rearward of the respective shaft holes 42H in the right and left link members 42. The supply member 41 is rockable about the shafts 51S within a longitudinal range of the elongated holes 42L with respect to the link members 42 (see FIGS. 16 and 17).

[Second Biasing Member]

The right and left link members 42 are provided with respective second biasing members 43 (see FIG. 18). Specifically, the second biasing members 43 are torsion coil springs and wrapped around the shaft 42S. The second biasing members 43 are anchored at their one ends to the respective holders 92 and at their other ends to the respective right and left link members 42 (see FIGS. 16 and 17). The second biasing members 43 bias the right and left link members 42 clockwise in FIGS. 16 and 17. In other words, the second biasing members 43 bias the associated supply member 41 toward moving it close to the ink-jet head 12. Alternatively, the second biasing members 43 may be leaf springs, compression springs or others.

[Transfer Member]

The transfer member 44 is joined to the second slop 532. The transfer member 44 has a tilt angle equal to the second slop 532. The transfer member 44 is a rectangular sheet-shaped member made of resin and has flexibility. The front end of the transfer member 44 extends further frontward beyond the front end of the container portion 53. The transfer member 44 is provided with discharge ports 44A formed at locations corresponding to the discharge ports 53E of the container portion 53 (see FIG. 18).

[Cleaning Liquid Supply Source]

The cleaning liquid supply source 13 (see FIG. 7) supplies a cleaning liquid to the supply members 41. The cleaning liquid is a liquid consisting mainly of water. The cleaning liquid supply source 13 includes a tank 13T, a pump 13P, a supply flow channel 13C, and a support plate 13B. The cleaning liquid is stored in the tank 13T. The supply flow channel 13C is branched downstream of the pump 13P into three channels. The branched supply channels 13C are connected to respective valves 13V. The valves 13V are, for example, non-return valves. The three valves 13V are disposed above the respective intake ports 53N of the supply members 41. The supply flow channel 13C and the valves 13V are supported by the support plate 13B. The valves 13V penetrate the support plate 13B and the respective discharge ports of the valves 13V project from the bottom surface of the support plate 13B.

Respective supply source lifts 13L (see FIG. 7) are provided at the front and rear of the support plate 13B. The supply source lifts 13L are each constituted by, for example, a cam mechanism or a ball screw. The supply source lifts 13L move the support plate 13B up and down from a supply position (see A in FIG. 23) to a backward position (see B in FIG. 23) and vice versa. The supply position is a position where the discharge ports of the valves 13V are inserted into the respective intake ports 53N (see FIGS. 20 and 22). The backward position is a position where the discharge ports of the valves 13V are moved back upward from the respective intake ports 53N (see FIGS. 19 and 21).

The bottom surface of the support plate 13B is provided with protrusions 13BT protruding below at locations corresponding to the projecting portions 91P of the projecting members 91 (see FIGS. 19 to 22). Furthermore, the bottom surface of the support plate 13B is provided to the right and left of each valve 13V with downwardly projecting projections 13BS (see FIGS. 19 and 20).

[Summary of Movement of Wiping Unit]

Figure 24:
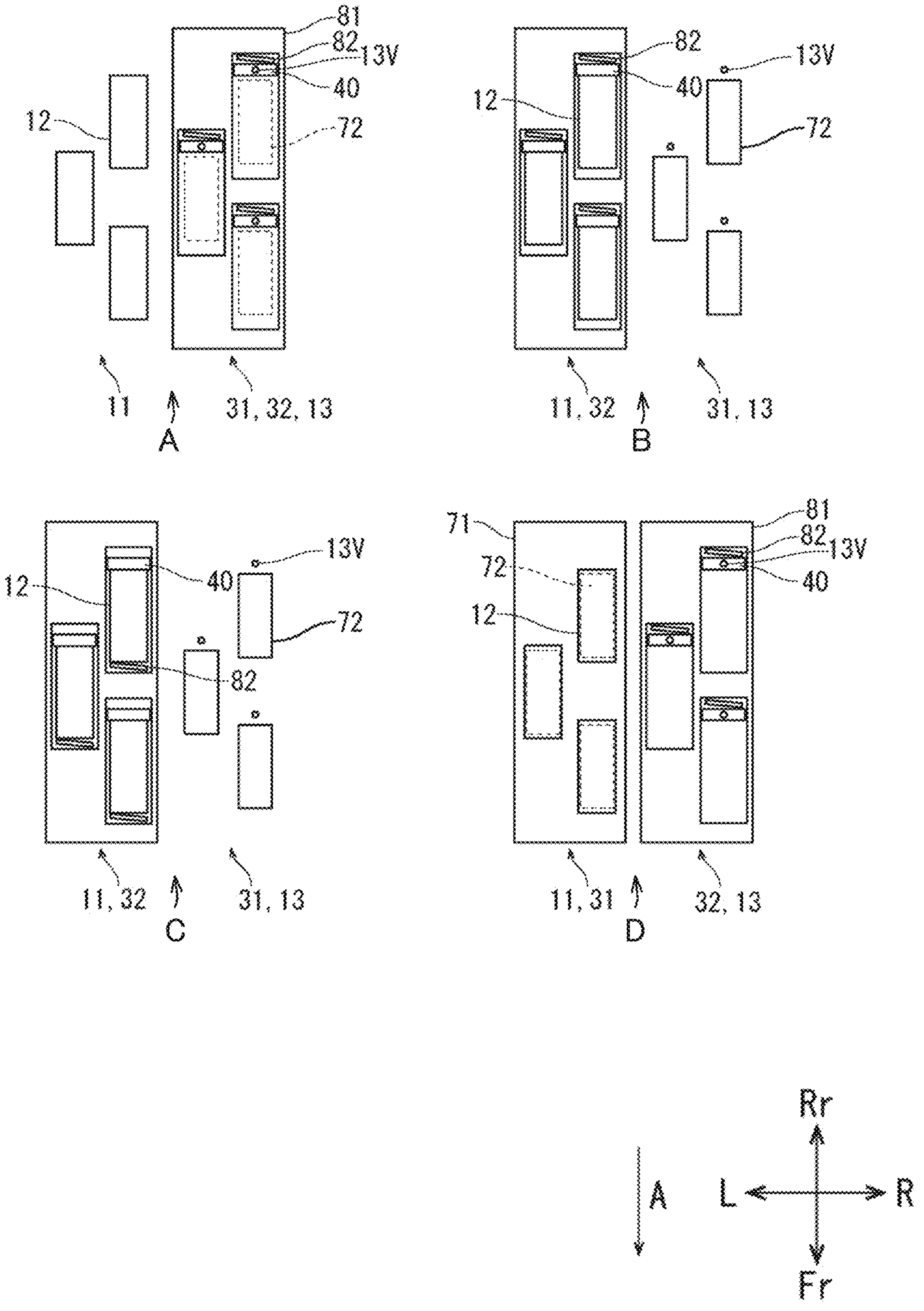
FIG. 24 shows plan views illustrating the movement of the wiping unit.

Next, a description will be given of a summary of movement of the wiping unit 32. FIG. 24 shows plan views illustrating the movement of the wiping unit 32. FIGS. 25 to 30 are right side views showing the movement of the wiping unit 32. The following description is of a summary of movement of the wiping unit 32 and the movements of the associated pair of the projecting member 91 and the supply member 41 will be described later.

Hereinafter, the state shown in A in FIG. 23 and A in FIG. 24 is described as an initial state. In the initial state, the head unit 11 is located at the image forming position (see A in FIG. 23), the capping unit 31 is located at the home position, the wiping unit 32 is located at the home position and the contact position, and the cleaning liquid supply source 13 is located at the supply position. The blades 82 are located at the wiping action start position (see A in FIG. 24). The cleaning liquid supply portions 40 are each supplied with a predetermined amount of cleaning liquid from the cleaning liquid supply source 13. The controller 2 executes the following processing at a predetermined timing. The predetermined timing is, for example, a timing at which the viscosity of ink in the nozzles 14N is expected to increase and, specifically, refers to when any image formation job has not been executed for a predetermined consecutive period of time.

First, the controller 2 actuates the head lifts 11L to move the head unit 11 up to the backward position (see B in FIG. 23). Furthermore, the controller 2 actuates the supply source lifts 13L to move the cleaning liquid supply source 13 up to the backward position.

Figure 25:
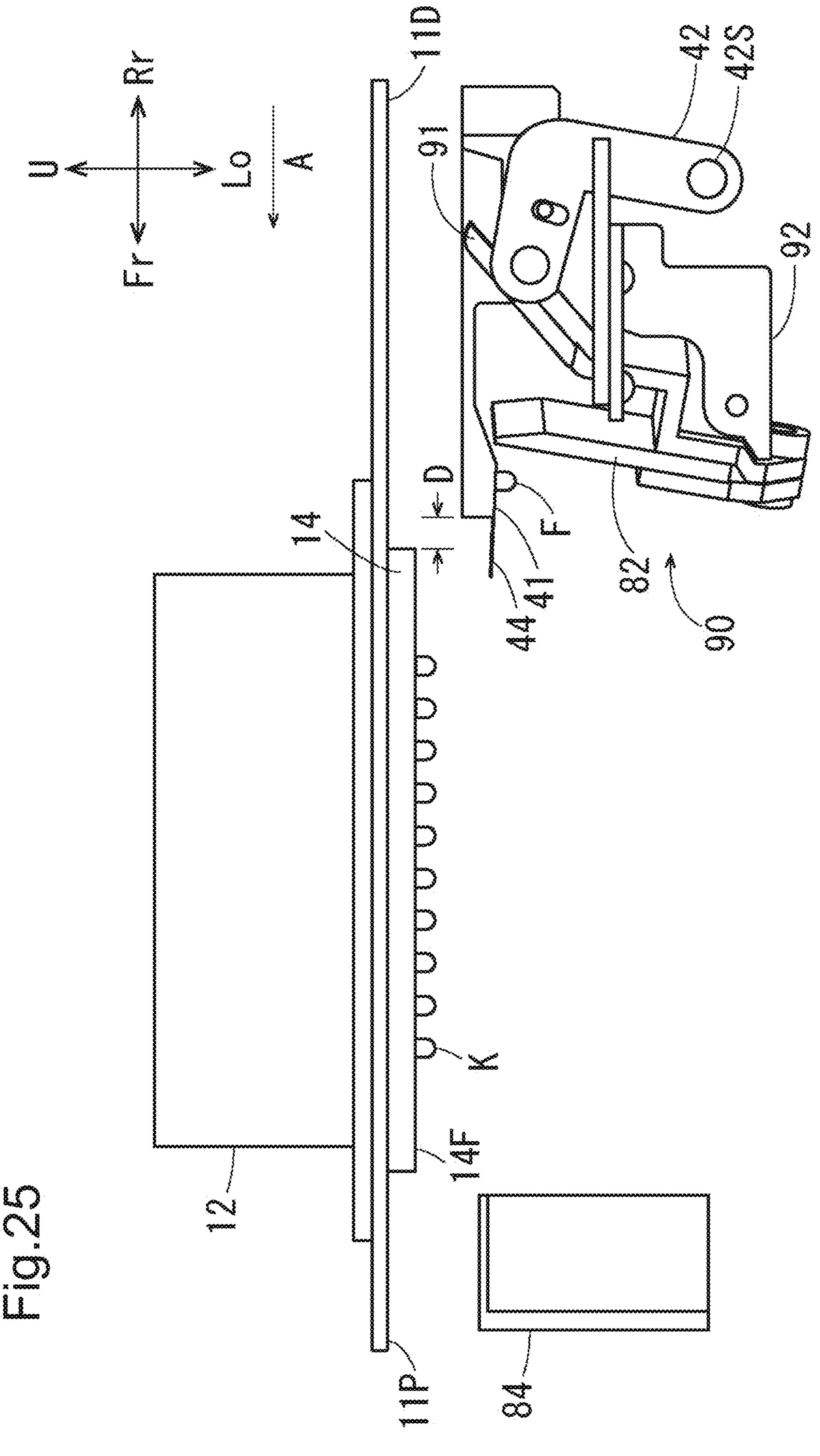
FIGS. 25 to 30 are right side views showing the movement of the wiping unit.

Next, the controller 2 actuates the capper sliding device 34 to slide the capping unit 31 to the maintenance position (see C in FIG. 23, B in FIG. 24, and FIG. 25). At this time, the wiping unit 32 is placed on the capping unit 31 and, therefore, the wiping unit 32 also moves to the maintenance position together with the capping unit 31. Next, the controller 2 actuates the head lifts 11L to move the head unit 11 down to a height where the wiping action is to be performed (hereinafter, referred to as a wiping position) (see D in FIG. 23 and FIG. 26).

Next, the controller 2 allows the ink-jet heads 12 to discharge respective predetermined amounts of ink and then actuates the carriage drive device 36 to slide the blades 82 frontward along the respective associated nozzle surfaces 14F (see C in FIG. 24 and FIGS. 27, 28, and 29). Each blade 82 scrapes away the cleaning liquid F protruding from the discharge ports 44A (see FIG. 27) and moves forward along the nozzle surface 14F (see FIGS. 28 and 29). On the nozzle surface 14F, residual ink K is diluted by the cleaning liquid F having been carried by the blade 82. Waste liquid W containing the residual ink K and the cleaning liquid F is scraped away by the blade 82 and falls into the recess 81U.

Figure 30:
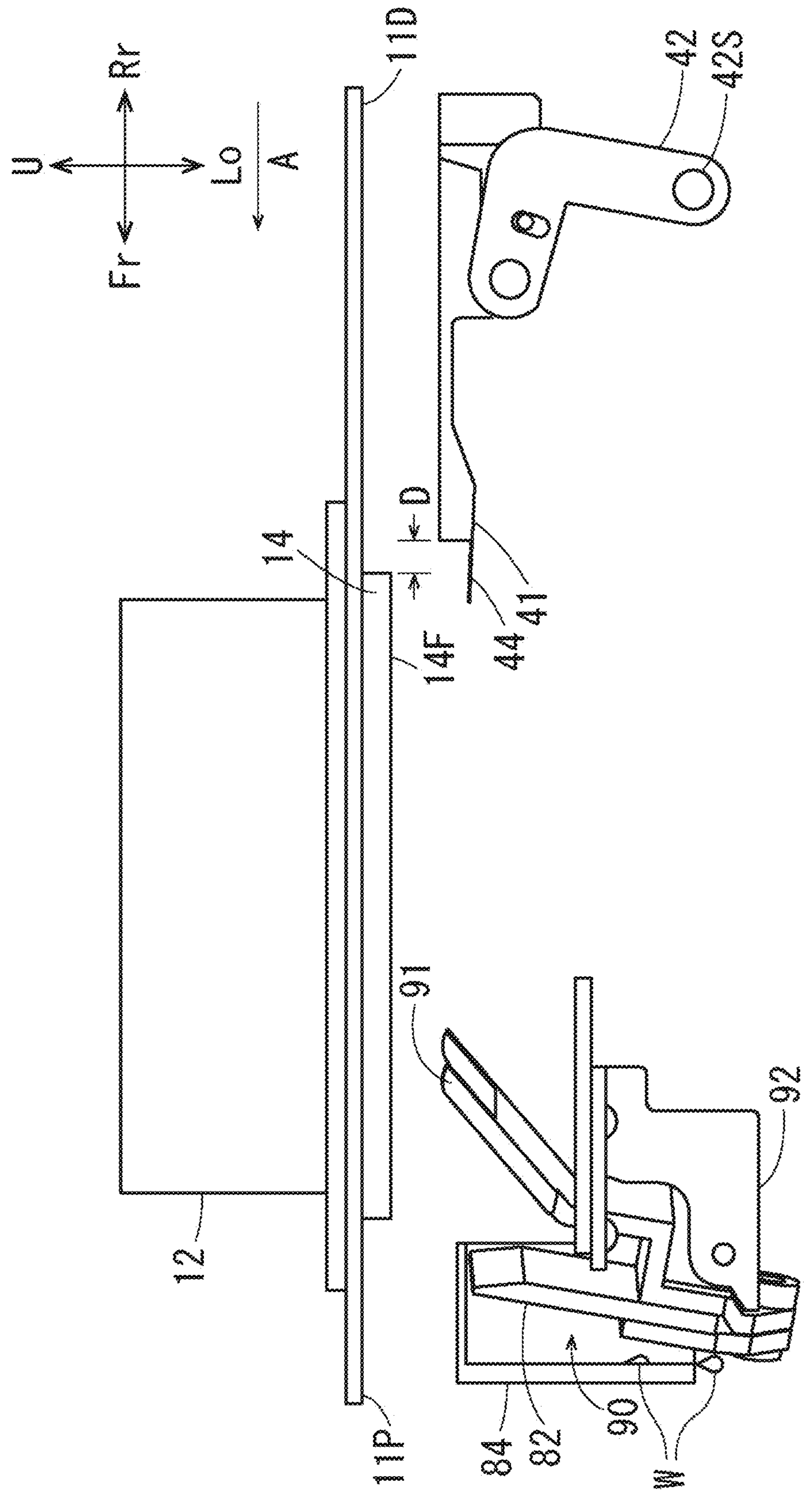

Next, the controller 2 actuates the head lifts 11L to move the head unit 11 up to the backward position (see C in FIG. 23 and FIG. 30). Next, the controller 2 actuates the carriage drive device 36 to return the blades 82 to the wiping action start position (see B in FIG. 24 and FIG. 25). Next, the controller 2 actuates the capper sliding device 34 to slide the capping unit 31 and the wiping unit 32 to the home position (see B in FIG. 23 and A in FIG. 24).

Next, the controller 2 actuates the wiper lifts 35 to move the wiping unit 32 up to the separated position (see E in FIG. 23). Next, the controller 2 actuates the capper sliding device 34 to slide the capping unit 31 to the maintenance position (see F in FIG. 23 and D in FIG. 24). At this time, the wiping unit 32 is kept away from the capping unit 31. Therefore, the wiping unit 32 stays at the home position and the capping unit 31 alone slides to the maintenance position.

Next, the controller 2 actuates the head lifts 11L to move the head unit 11 down to a height where nozzle surfaces 14F contact the respective associated caps 72 (hereinafter, referred to as a capping position) (see G in FIG. 23). In this manner, the caps 72 are fitted onto the respective associated nozzle surfaces 14F.

In executing an image formation job, the controller 2 actuates the head lifts 11L to move the head unit 11 up to the backward position (see F in FIG. 23), actuates the capper sliding device 34 to slide the capping unit 31 to the home position (see E in FIG. 23), and actuates the wiper lifts 35 to move the wiping unit 32 down to the contact position (see B in FIG. 23). Next, the controller 2 actuates the head lifts 11L to move the head unit 11 down to the image forming position (see A in FIG. 23) and executes the image formation job.

[Movements of Projecting Member and Supply Member]

Next, a description will be given of the movements of the associated pair of the projecting member 91 and the supply member 41. FIG. 16 shows a state where the projecting member 91 and the supply member 41 are not yet pressed down (hereinafter, referred to as a non-pressed state). On the other hand, FIG. 17 shows a state where the projecting member 91 is pressed down by the parallel surface 11P or the protrusions 13BT and the supply member 41 is pressed down by the pressing portion 11D or the projections 13BS (hereinafter, referred to as a pressed state). The first biasing member 93 biases the projecting member 91 counterclockwise in FIGS. 16 and 17. Furthermore, the second biasing members 43 bias the link members 42 clockwise.

[Non-Pressed State]

Figure 19:
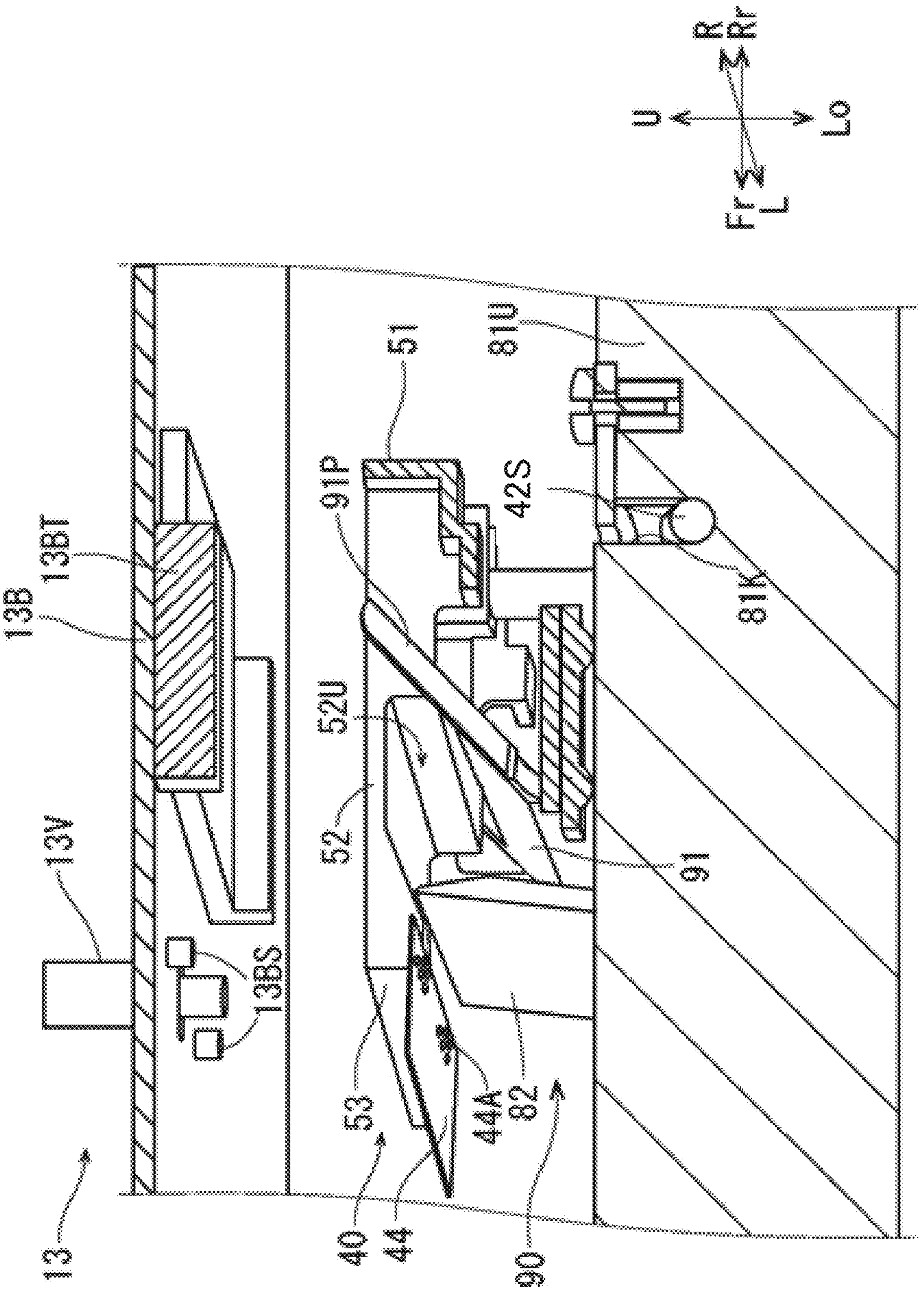
FIGS. 19 to 22 are perspective views showing cross-sections of the cleaning liquid supply portion and the cleaning liquid supply source.
Figure 21:
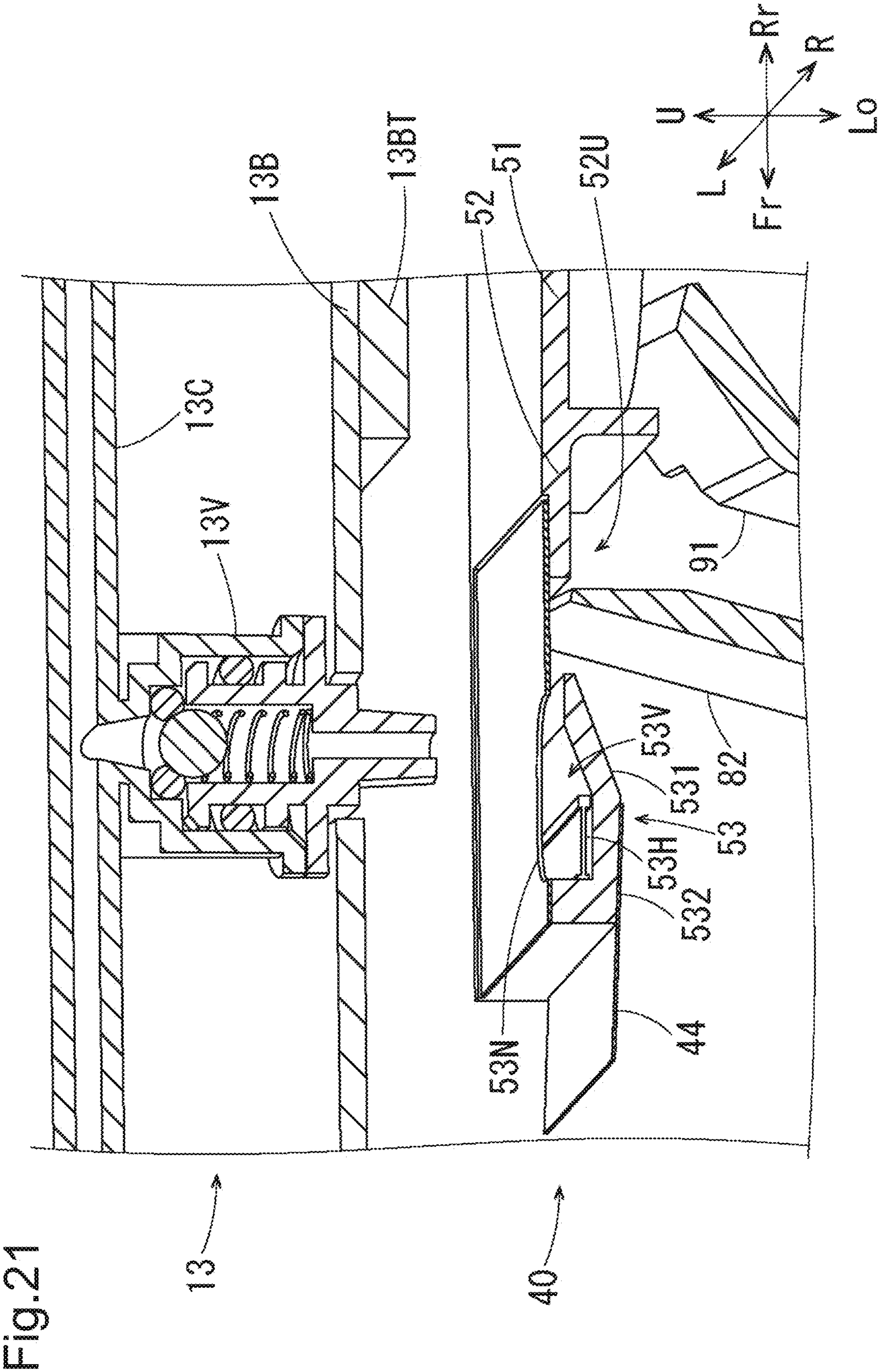

When the wiping unit 32 is located at the home position and the cleaning liquid supply source 13 moves up to the backward position, the non-pressed state occurs (see FIGS. 19 and 21 and B, E, F, and G in FIG. 23). Furthermore, also when the wiping unit 32 is located at the maintenance position and the head unit 11 moves up to the backward position, the non-pressed state occurs (see C in FIG. 23).

[Pressed State]

Figure 20:
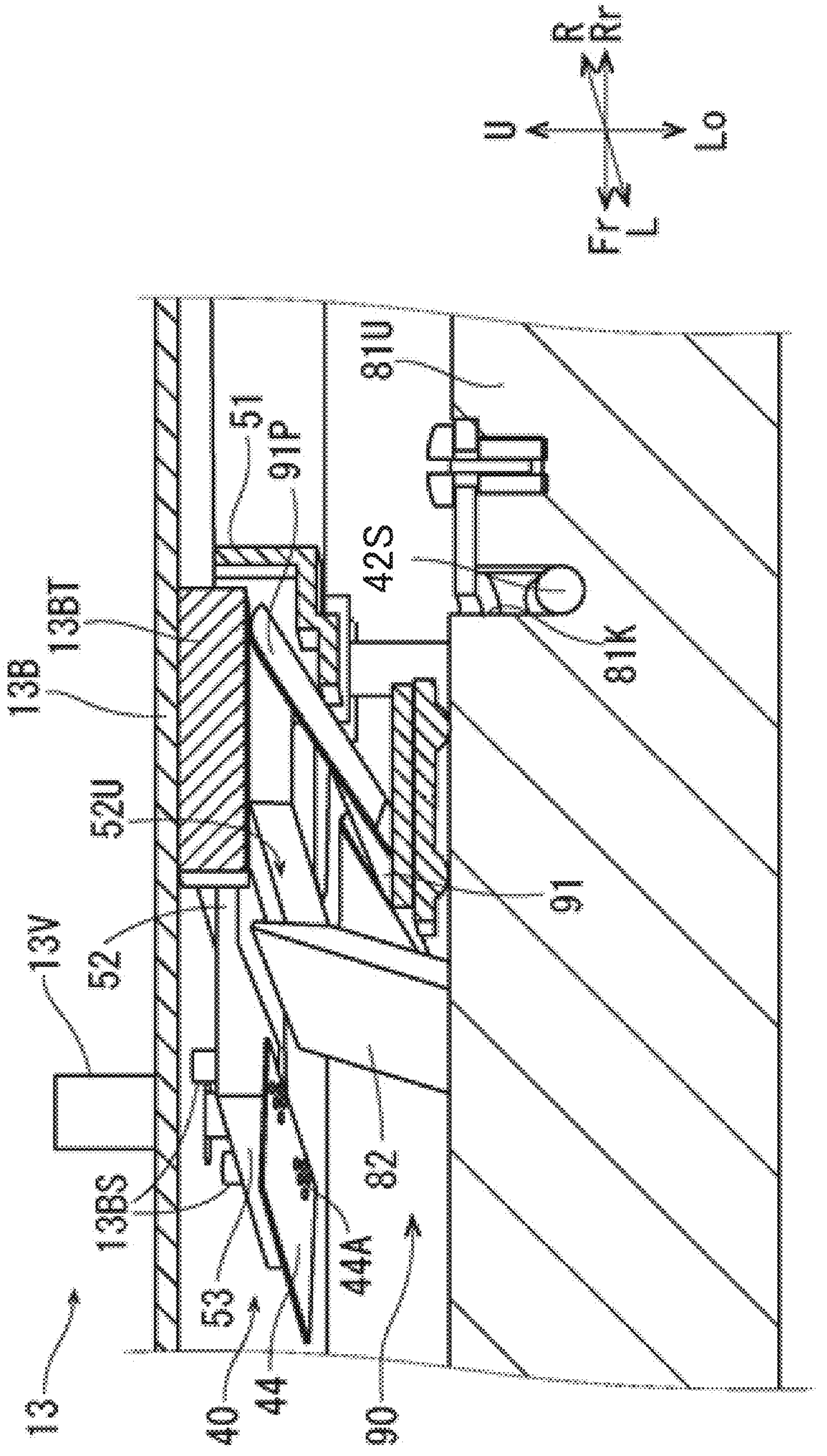
Figure 22:
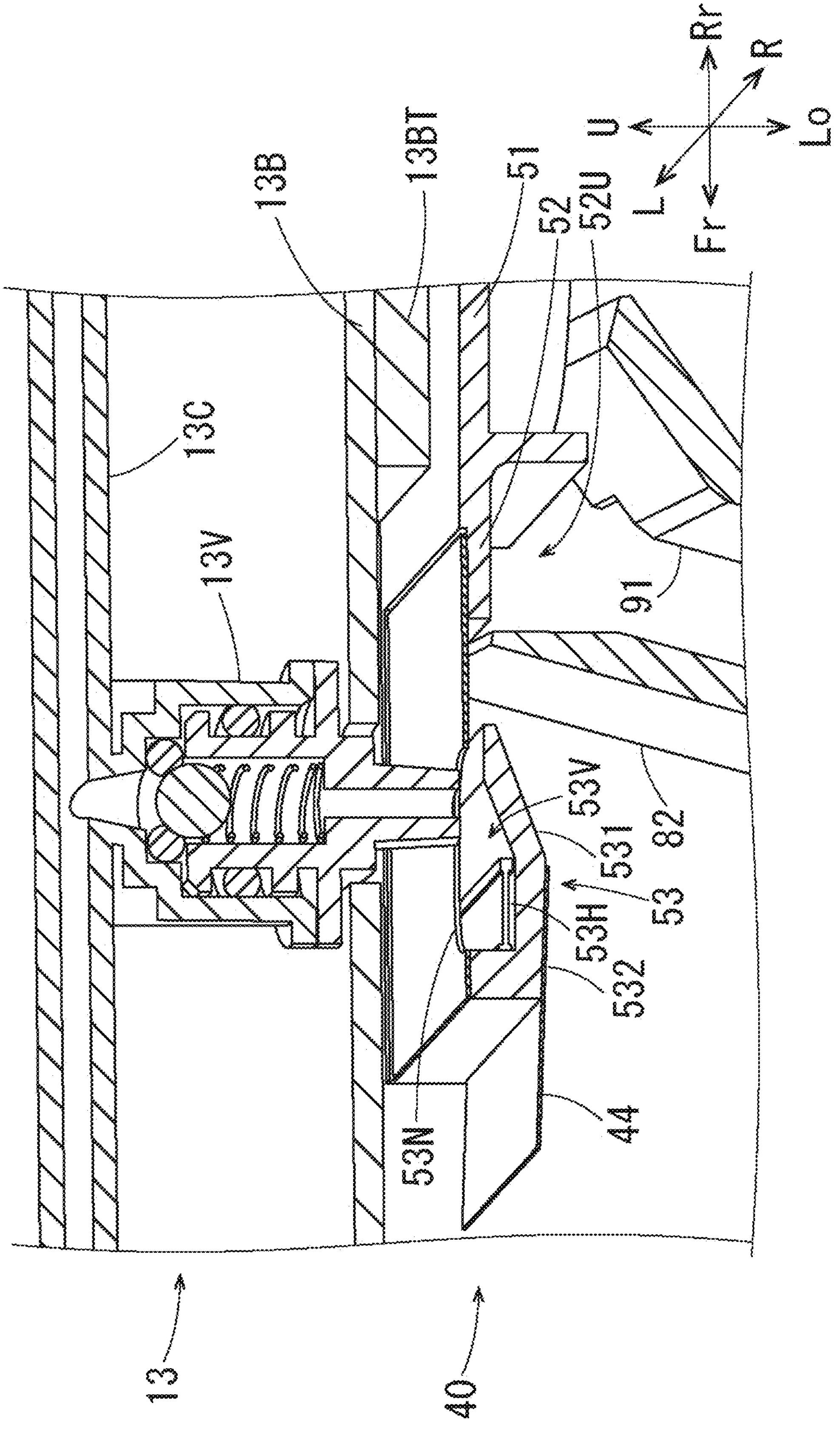

On the other hand, when the wiping unit 32 is located at the home position and the cleaning liquid supply source 13 moves down to the supply position, the pressed state occurs (see FIGS. 20 and 22 and A in FIG. 23). Specifically, when in the non-pressed state (see FIGS. 16, 19, and 21) the cleaning liquid supply source 13 moves down (see FIGS. 17, 20, and 22), the protrusions 13BT press down the projecting portions 91P against the biasing force of the first biasing member 93 and the projections 13BS press down the supply member 41 against the biasing force of the second biasing members 43. Thus, the discharge ports of the valves 13V are inserted into the intake ports 53N of the respective associated supply members 41 (see FIG. 22), which makes it possible to supply a cleaning liquid from the cleaning liquid supply source 13 to the cleaning liquid supply portions 40.

Furthermore, also when the wiping unit 32 is located at the maintenance position and the head unit 11 moves down to the wiping position, the pressed state occurs (see D in FIG. 23). When in the non-pressed state (see FIG. 16) the head unit 11 moves down (see FIG. 17), the parallel surface 11P presses down the projecting portions 91P of each projecting member 91 against the biasing force of the first biasing member 93 and each pressing portion 11D presses down the associated supply member 41 against the biasing force of the second biasing members 43.

When transition is made from the non-pressed state to the pressed state, the projecting portions 91P are pressed down and, thus, each blade 82 rocks clockwise. Therefore, the tilt angle $\beta$ of the front surface of the blade 82 with respect to the vertical line V in the pressed state (see FIG. 17) becomes greater than the tilt angle $\alpha$ thereof with respect to the vertical line V in the non-pressed state (see FIG. 16). Furthermore, since the supply member 41 is pressed down, the link members 42 rock counterclockwise. Therefore, in the pressed state, the supply member 41 moves frontwardly downward relative to the non-pressed state.

Now focusing on the top edge of the blade 82, in the non-pressed state, the top edge of the blade 82 is located below the first slope 531 of the supply member 41. On the other hand, in the pressed state, the top edge of the blade 82 moves relatively rearwardly downward and the supply member 41 moves relatively frontwardly downward. However, the top edge of the blade 82 enters the non-contact space 52U located below the intermediate portion 52 of the supply member 41, which leads to avoidance of interference between the blade 82 and the supply member 41.

[Wiping Action]

Next, a detailed description will be given of the wiping action. When the head unit 11 moves up to the backward position and the wiping unit 32 slides to the maintenance position (see C in FIG. 23, B in FIG. 24, and FIG. 25), each associated pair of the projecting member 91 and the supply member 41 come into the non-pressed state (see FIG. 16). At this time, the rear end surface of the nozzle plate 14 and the front end surface of the supply member 41 are located a distance D away from each other in the front-to-rear direction (see FIG. 25). Cleaning liquid F protrudes from the discharge ports 44A (see FIG. 18) of the transfer member 44 (see FIG. 25). Residual ink K is attached to the nozzle surface 14F (see FIG. 25).

Figure 26:
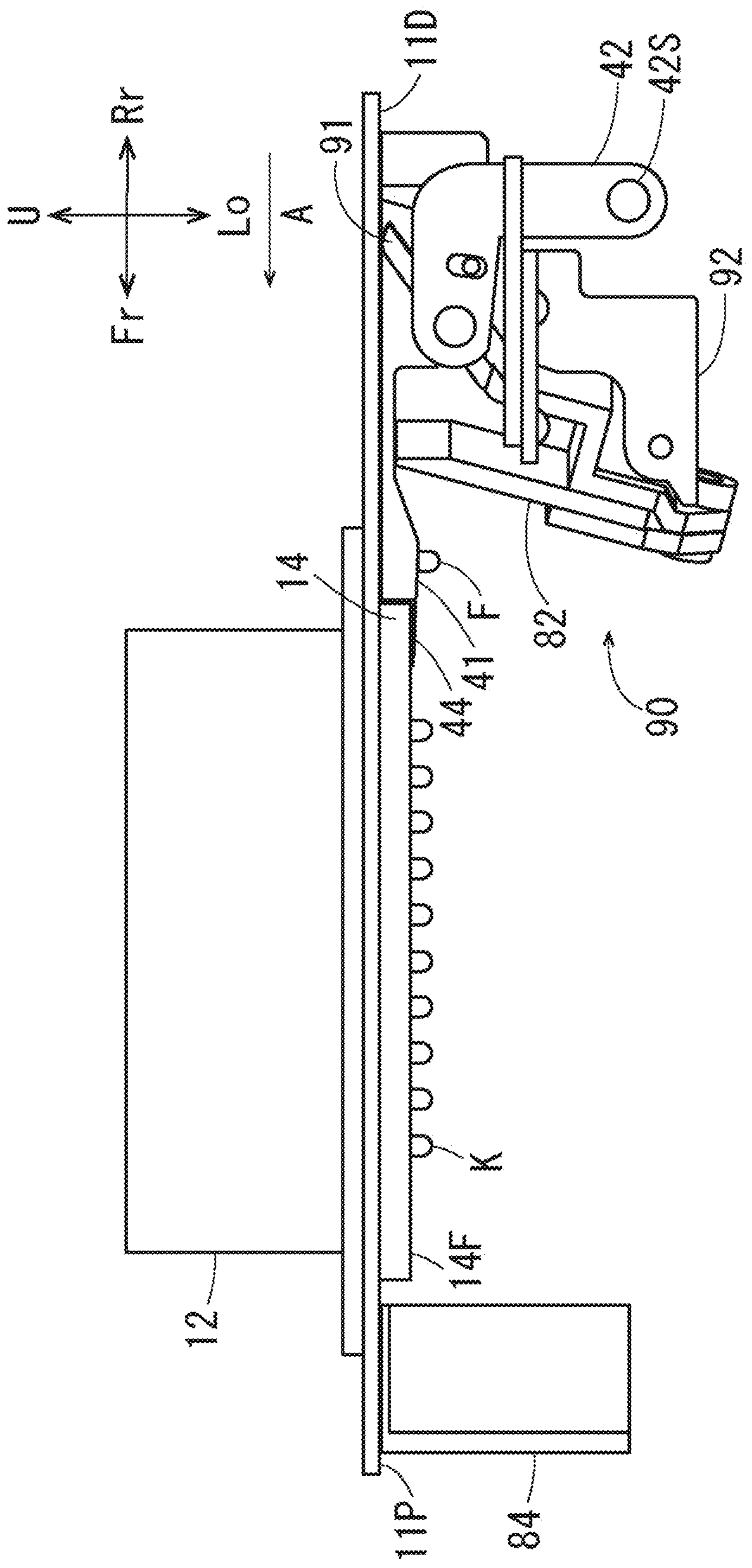
Figure 27:
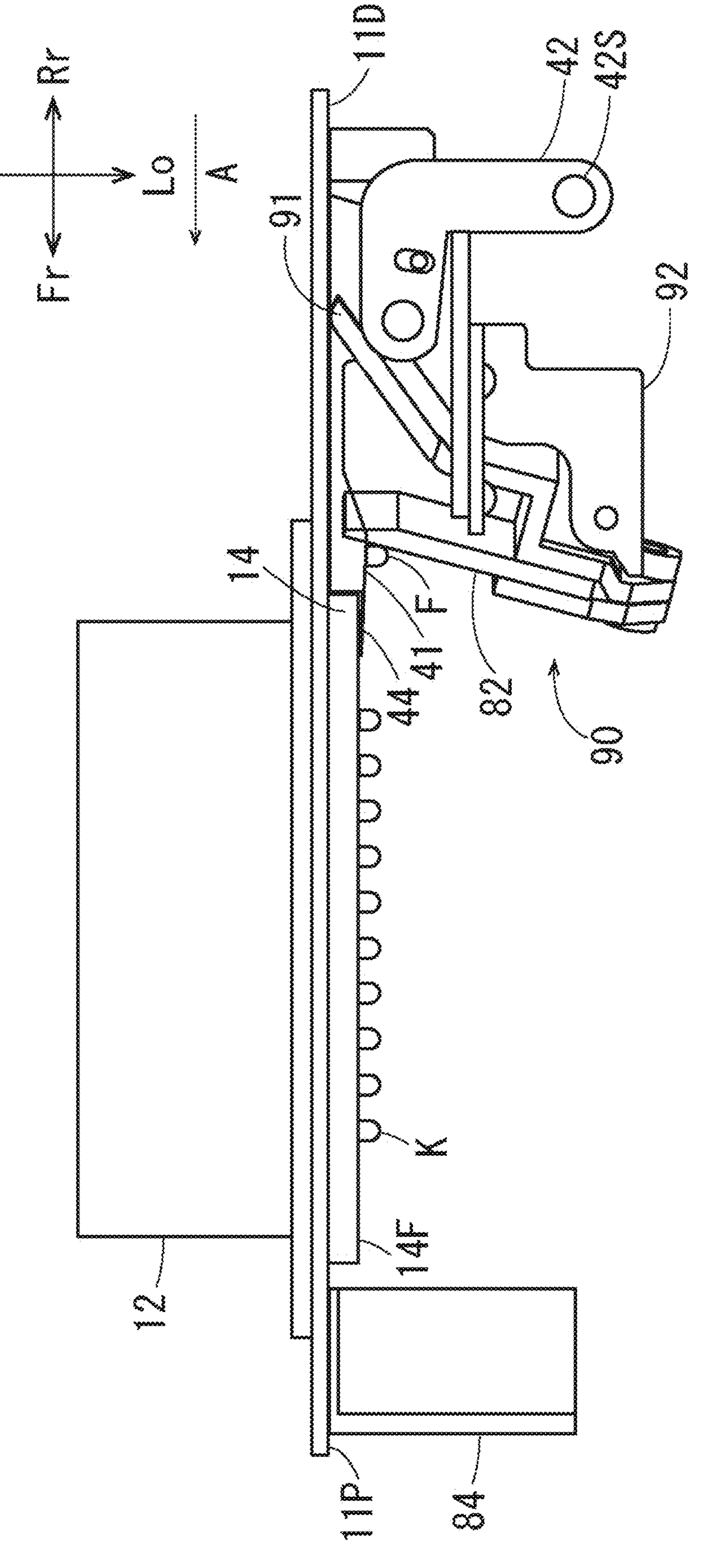
Figure 28:
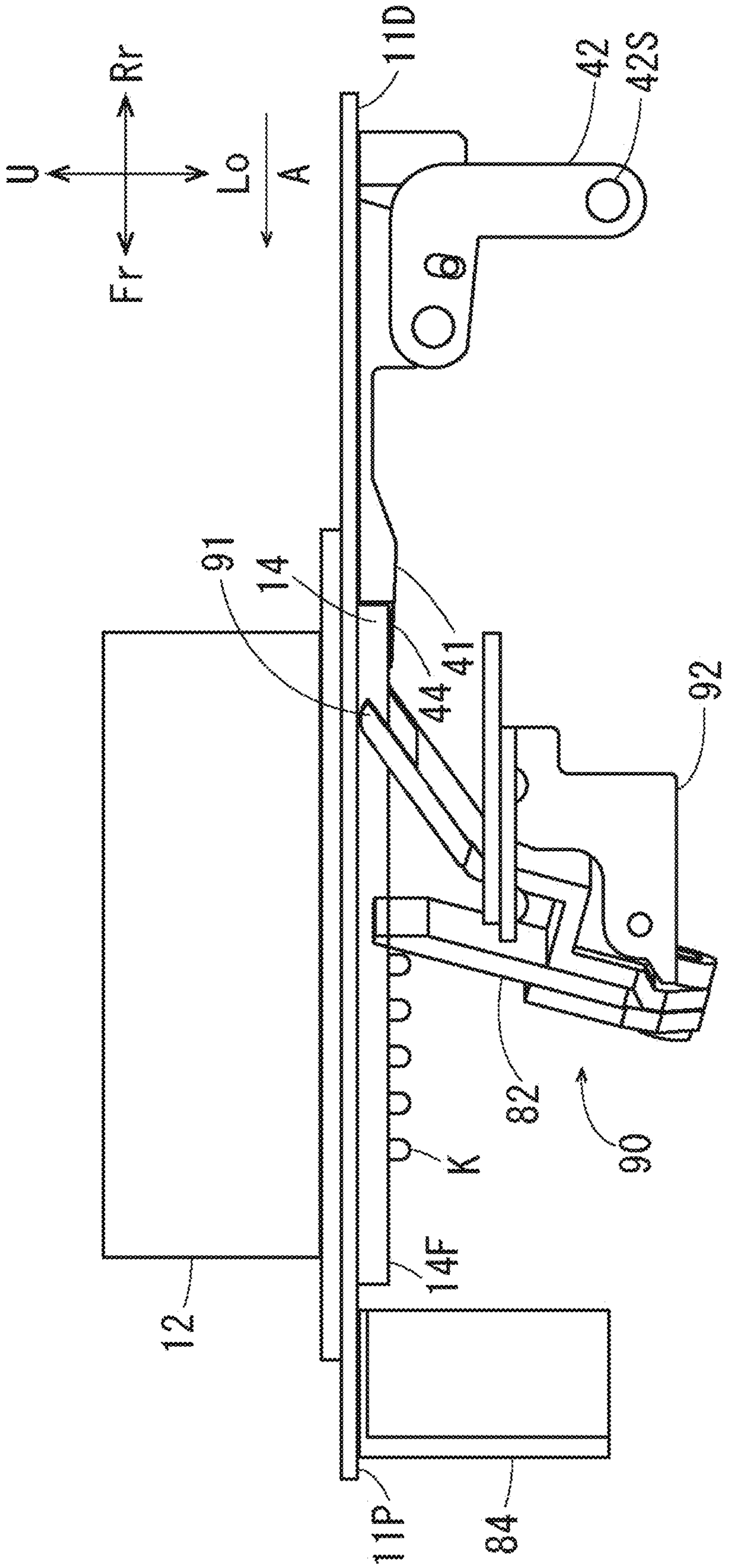
Figure 29:
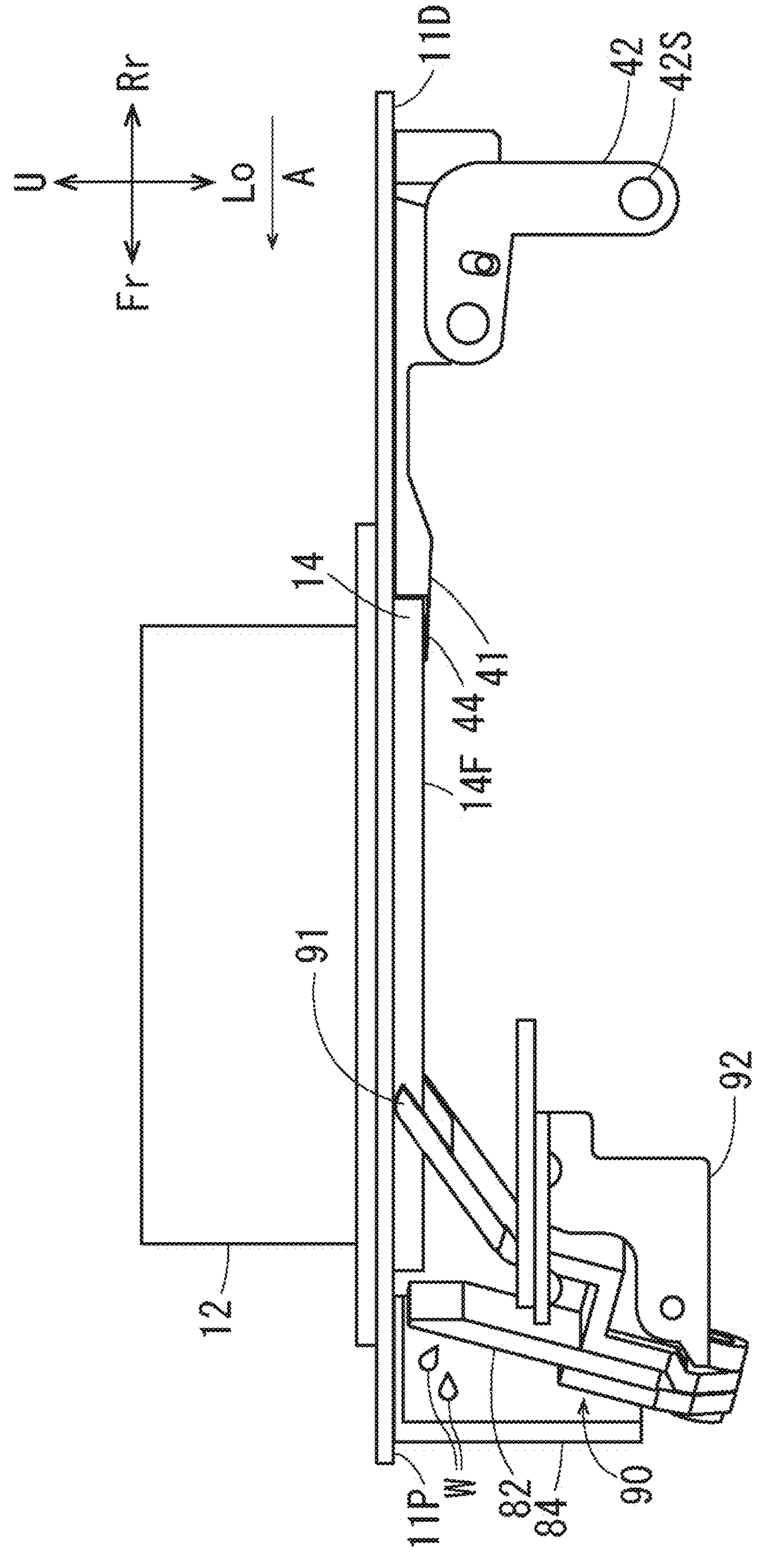

Next, the controller 2 actuates the head lifts 11L to move the head unit 11 down to the wiping position (see D in FIG. 23 and FIG. 26). Thus, the parallel surface 11P presses down each associated pair of the projecting member 91 and the supply member 41 and, therefore, the projecting member 91 and the supply member 41 come into the pressed state (see FIG. 17). At this time, the blade 82 rocks from the tilt angle α to the tile angle β. Furthermore, the supply member 41 moves frontward and, thus, the distance between the front end surface of the supply member 41 and the rear end surface of the nozzle plate 13 is reduced. At this time, the front end surface of the supply member 41 may contact the rear end surface of the nozzle plate 14. In addition, the transfer member 44 moves below the nozzle surface 14F and at least a front end portion of the top surface of the transfer member 44 contacts the nozzle surface 14F. Therefore, a step-like difference between the second slop 532 and the nozzle surface 14F is eliminated.

Next, the controller 2 allows a predetermined amount of ink to be discharged from each of the ink-jet heads 12. By this operation, the ink increased in viscosity is discharged from the nozzles 14N. Next, the controller 2 actuates the carriage drive device 36 to slide the blades 82 frontward along the respective associated nozzle surfaces 14F (see C in FIG. 24). Each blade 82 scrapes away the cleaning liquid F protruding from the discharge ports 44A (see FIG. 27), moves along the bottom surface of the transfer member 44 to the nozzle surface 14F, and then moves forward along the nozzle surface 14F (see FIG. 28). Although in FIGS. 27 and 28 the top edge of the blade 82 is overlapped with the supply member 41 and the nozzle plate 14, it actually forms a rearward flexure on the supply member 41 and the nozzle plate 14.

In forward movement of each blade 82 along the nozzle surface 14F, the blade 82 moves forward while the projecting member 91 is in contact with the parallel surface 11P and, therefore, the tilt angle of the blade 82 is kept constant. Therefore, the blade 82 is pressed at a constant load against the nozzle surface 14F. In addition, the blade 82 is pressed against the nozzle surface 14F mainly by an elastic force of the first biasing member 93. The elastic force of the first biasing member 93 is adjusted to minimize the flexure of the blade 82.

On the nozzle surface 14F, residual ink K is diluted by the cleaning liquid F having been carried by the blade 82. Waste liquid W containing the residual ink K and the cleaning liquid F is scraped away by the blade 82 and flows down along the front and rear surfaces of the blade 82. The waste liquid W having flowed down along the rear surface of the blade 82 passes through the through hole 91A in the projecting member 91 and falls into the recess 81U (see FIG. 11). On the other hand, the waste liquid W having flowed down along the front surface of the blade 82 flows on the front surface of the fixing member 94 and then along the lower edge of the fixing member 94 and the lower edge of the projecting member 91, then concentrates to the center thereof in the right-to-left direction, and then falls into the recess 81U.

In parallel with the passage of the blades 82 through the front ends of the respective associated nozzle surfaces 14F (see FIG. 29), the controller 2 actuates the head lifts 11L to move the head unit 11 up to the backward position (see FIG. 30). At this time, the head base 11B also moves up and, therefore, each associated pair of the projecting member 91 and the supply member 41 return to the non-pressed state. Furthermore, each blade 82 moves away from the nozzle surface 14F and, thus, the flexural deformation of the blade 82 is eliminated. By this action, the waste liquid W is released from the blade 82 toward the receipt member 84. The waste liquid W received by the receipt member 84 flows down along the inside surface of the receipt member 84 and then falls into the recess 81U.

In the absence of the structure that changes the tilt angle of the blade 82 (including the projecting member 91, the holders 92, and the first biasing member 93), the blade 82 would be pressed against the nozzle surface 14F only by an elastic force due to flexural deformation of the blade 82 itself. Therefore, upon passage of the top edge of the blade 82 through the front end of the nozzle surface 14F, the flexure of the blade 82 would be abruptly eliminated, which might scatter the waste liquid W. Unlike the structure as just described, in this embodiment, the flexure of the blade 82 is reduced to a small amount compared to in the absence of the structure that changes the tilt angle of the blade 82. Furthermore, since the tilt of the blade 82 is restored concurrently with the elimination of flexural deformation thereof, the waste liquid W is mainly released frontward and received by the receipt member 84, which prevents scatter of the waste liquid W.

In the proposed general technique described previously, a supply member that supplies a cleaning liquid to the nozzle surface is provided along with the ink-jet head, which may cause a sheet to contact the supply member during image formation, thus defacing the sheet or damaging the supply member. As a solution to this problem, there is a conceivable structure in which not only the blade but also the supply member are kept away from the ink-jet head (the nozzle plate thereof). In doing so, in order to prevent interference between the supply member and the nozzle plate, it is necessary that, during wiping action of the blade, the supply member is located upstream away from the nozzle plate in the forward direction of the wiping action. However, in this case, the cleaning liquid may not be able to be transferred from the supply member to the nozzle surface or the cleaning liquid may be accumulated in a space between the supply member and the nozzle surface.

Unlike the above, the ink-jet recording apparatus 1 according to this embodiment includes: ink-jet heads 12 including respective nozzle plates 14; head lifts 11L that move the ink-jet heads 12 up and down; blades 82 each of which performs a wiping action along a nozzle surface 14F of the associated nozzle plate 14; supply members 41 each provided upstream of the associated nozzle plate 14 in a forward direction A of the wiping action and capable of supplying a cleaning liquid to the associated blade 82 upon contact with a top edge of the blade 82; link members 42 that support the associated supply member 41 and rock about a shaft 42S provided below the supply member 41; biasing members (second biasing members 43) that bias the link members 42 upstream in the forward direction A; and pressing portions 11D each provided in conjunction with the associated ink-jet head 12 and facing the top surface of the associated supply member 41, wherein while the ink-jet heads 12 are moved up, the supply members 41 are kept away from the respective associated nozzle plates 14 upstream in the forward direction A, and when the ink-jet heads 12 moves down, the pressing portions 11D press down the respective associated supply members 41 against the biasing forces of the associated biasing members and, thus, the supply members 41 move downstream in the forward direction A.

In the structure in which each supply member 41 is kept away from the associated nozzle plate 14 during image formation, in order to prevent interference between the supply member 41 and the nozzle plate 14, it is necessary that, during wiping action of the blade 82, the supply member 41 is located upstream away from the nozzle plate 14 in the forward direction A of the wiping action. However, in this case, the cleaning liquid F may not be able to be transferred from the supply member 41 to the nozzle surface 14F or the cleaning liquid F may be accumulated in a space between the supply member 41 and the nozzle plate 14. Unlike the case as just described, in this embodiment, downward movement of the ink-jet heads 12 allows the supply members 41 to move downstream in the forward direction A and thus reduce the space between each associated pair of the supply member 41 and the nozzle plate 14. Therefore, the cleaning liquid F can be surely transferred and can be less likely to be accumulated in the space. Hence, in this embodiment, the transfer of the cleaning liquid F from the supply member 41 to the nozzle surface 14F can be stabilized.

Furthermore, the ink-jet recording apparatus 1 according to this embodiment includes transfer members 44 joined to the bottom surfaces of the respective associated supply members 41 and extending downstream in the forward direction A from the supply members 41, wherein when the ink-jet heads 12 move down, the supply members 41 move about the respective associated shafts 42S and downstream in the forward direction A to allow the transfer members 41 to move below the respective associated nozzle surfaces 14F. In this structure, each transfer member 44 eliminates a space or step-like difference between the supply member 41 and the nozzle surface 14F and, thus, the cleaning liquid F can be smoothly transferred to the nozzle surface 14F.

In the ink-jet recording apparatus 1 according to this embodiment, each transfer member 44 is tilted with its distal end highest. In this structure, the distal end of the transfer member 44 closely contacts the nozzle surface 14F and, therefore, the cleaning liquid F can be smoothly transferred to the nozzle surface 14F.

Furthermore, in the ink-jet recording apparatus 1 according to this embodiment, each transfer member 44 has flexibility. In this structure, damage to the nozzle surface 14F due to impact against the transfer member 44 can be reduced. In addition, the contact of the transfer member 44 with the nozzle surface 14F can be increased.

In the ink-jet recording apparatus 1 according to this embodiment, each supply member 41 rocks with respect to the associated link members 42. In this structure, the followability of the supply member 41 to the associated pressing portion 11D can be increased. In addition, the contact of the transfer member 44 with the nozzle surface 14F can be increased.

While the present disclosure has been described in detail with reference to the embodiments thereof, it would be apparent to those skilled in the art the various changes and modifications may be made therein within the scope defined by the appended claims.

What is claimed is:

1. An ink-jet recording apparatus comprising:
- an ink-jet head comprising a nozzle plate;
- a head lift that moves the ink-jet head up and down;
- a blade that performs a wiping action along a nozzle surface of the nozzle plate;
- a supply member that is provided upstream of the nozzle plate in a forward direction of the wiping action and supplies a cleaning liquid to the blade upon contact with a top edge of the blade;
- a link member that supports the supply member and rocks about a shaft provided below the supply member;
- a biasing member that biases the link member upstream in the forward direction; and
- a pressing portion that is provided in conjunction with the ink-jet head and faces a top surface of the supply member,
- wherein while the ink-jet head is moved up, the supply member is kept away from the nozzle plate upstream in the forward direction, and
- when the ink-jet head moves down, the pressing portion presses down the supply member against a biasing force of the biasing member and, thus, the supply member moves downstream in the forward direction.

2. The ink-jet recording apparatus according to claim 1,
- further comprising a transfer member joined to a bottom surface of the supply member and extending downstream in the forward direction from the supply member,
- wherein when the ink-jet head moves down, the supply member moves about the shaft and downstream in the forward direction to allow the transfer member to move below the nozzle surface.

3. The ink-jet recording apparatus according to claim 2, wherein the transfer member is tilted with a distal end thereof highest.

4. The ink-jet recording apparatus according to claim 2, wherein the transfer member has flexibility.

5. The ink-jet recording apparatus according to claim 2, wherein the transfer member is provided with a discharge port from which the cleaning liquid supplied by the supply member protrudes.

6. The ink-jet recording apparatus according to claim 1, wherein the supply member rocks with respect to the link member.

* * * * *